(12) United States Patent
Quamar et al.

(10) Patent No.: US 12,393,615 B2
(45) Date of Patent: Aug. 19, 2025

(54) GUIDED EXPLORATION FOR CONVERSATIONAL BUSINESS INTELLIGENCE

(71) Applicant: International Business Machines Corporation, Armonk, NY (US)

(72) Inventors: Abdul Quamar, San Jose, CA (US);
Fatma Ozcan, San Jose, CA (US);
Chuan Lei, Cupertino, CA (US);
Vasilis Efthymiou, San Jose, CA (US);
Venkata Vamsikrishna Meduri, Mesa, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 17/188,405

(22) Filed: Mar. 1, 2021

(65) Prior Publication Data
US 2022/0277031 A1    Sep. 1, 2022

(51) Int. Cl.
*G06F 16/332*    (2025.01)
*G06F 16/3329*    (2025.01)
*G06N 20/00*    (2019.01)

(52) U.S. Cl.
CPC ...... *G06F 16/3322* (2019.01); *G06F 16/3329* (2019.01); *G06N 20/00* (2019.01)

(58) Field of Classification Search
CPC ............. G06F 16/3322; G06F 16/3329; G06F 16/2465; G06F 16/283; G06F 16/90332;
(Continued)

(56) References Cited

U.S. PATENT DOCUMENTS 6,741,959 B1    5/2004    Kaiser
8,935,277 B2    1/2015    Kuchmann-Beauger et al.
(Continued)

OTHER PUBLICATIONS

Hurrell et al., "A Conversational Collaborative Filtering Approach To Recommendation".
(Continued)

*Primary Examiner* — Yuk Ting Choi
(74) *Attorney, Agent, or Firm* — Intelletek Law Group, PLLC; Gabriel Daniel, Esq.

(57) ABSTRACT

A computing device and computer-implemented method to provide access to business intelligence data via a conversational interface is described. The method begins with receiving prior user interactions based on corresponding pairs of user queries and computing device responses, with the conversational interface. Received also is a business intelligence ontology and access to a conversational space structure for the conversational interface. The computing device executes a machine learning model based upon the prior user interactions, business intelligence ontology, and the conversational space structure to predict possible next queries. The possible next queries are sent to a user. In one example, the computing device receives a user query, which is in addition to the prior user interactions with the conversational interface. A response to the query is generated. The response to the query is sent to the user prior to sending the possible next queries, which have been predicted.

22 Claims, 16 Drawing Sheets

(58) Field of Classification Search
CPC ........ G06N 20/00; G06N 3/044; G06N 3/045; G06N 5/01; G06N 5/02; G06N 7/01; G06N 20/20; G06N 3/08
See application file for complete search history.

(56) References Cited

U.S. PATENT DOCUMENTS

| | | | |
|---|---|---|---|
| 9,177,047 B2 | 11/2015 | Xie et al. | |
| 9,665,662 B1 | 5/2017 | Gautam et al. | |
| 9,690,848 B2 | 6/2017 | Thollot | |
| 9,984,116 B2 | 5/2018 | Rais et al. | |
| 10,409,846 B2 | 9/2019 | Schilder et al. | |
| 10,528,870 B2 | 1/2020 | Lindsley | |
| 10,719,539 B2 | 7/2020 | Smith et al. | |
| 10,777,191 B2 | 9/2020 | Shmueli-Scheuer | |
| 10,783,188 B2 | 9/2020 | Wang | |
| 11,694,281 B1* | 7/2023 | Liu | G06Q 30/0633 704/9 |
| 2007/0078889 A1 | 4/2007 | Hoskinson | |
| 2010/0057687 A1* | 3/2010 | Shen | G06Q 30/0241 707/736 |
| 2015/0006432 A1 | 1/2015 | Grosset et al. | |
| 2017/0351962 A1* | 12/2017 | Appel | G06N 7/01 707/737 |
| 2018/0225391 A1* | 8/2018 | Sali | G06F 7/588 707/736 |
| 2018/0373753 A1 | 12/2018 | Flaks | |
| 2019/0163782 A1 | 5/2019 | Drushku | |
| 2019/0294693 A1 | 9/2019 | Kanayama et al. | |
| 2019/0354874 A1* | 11/2019 | Shah | G06N 5/022 |
| 2020/0042642 A1* | 2/2020 | Bakis | G06F 40/35 707/736 |
| 2020/0073984 A1 | 3/2020 | Sen et al. | |
| 2020/0143261 A1 | 5/2020 | Morgan et al. | |
| 2020/0234177 A1* | 7/2020 | Matcha | G06F 18/214 707/736 |
| 2020/0236068 A1 | 7/2020 | Tenyenhuis | |
| 2020/0265339 A1 | 8/2020 | Eisenzopf | |
| 2020/0327886 A1 | 10/2020 | Shalaby et al. | |
| 2020/0334300 A1 | 10/2020 | Birnbaum | |
| 2020/0334580 A1 | 10/2020 | Sheopuri | |
| 2020/0341976 A1 | 10/2020 | Aggarwal | |
| 2021/0182798 A1 | 6/2021 | Bikumala | |
| 2021/0192397 A1* | 6/2021 | Rastogi | G06Q 10/02 707/736 |

OTHER PUBLICATIONS

Quamar et al., "Conversational BI : An Ontology-Driven Conversation System For Business Intelligence Applications", pp. 3369-3381.

Castaldo et al., "Conversational Data Exploration".

Chen et al., "Towards Explainable Conversational Recommendation", Proceedings of the Twenty-Ninth International Joint Conference on Artificial Intelligence (IJCAI-20), pp. 2294-3000.

Paraiso, E. C. et al., "Speech PA: An Ontology-Based Speech Interface for Personal Assistants", IEEE/WIC/ACM International Conference on Intelligent Agent Technology (2005), pp. 657-663.

Amith, M. et al., "An Ontology-Powered Dialogue Engine for Patient Communication Vaccines", CEUR Workshop Proc. (2019), vol. 2427, pp. 24-30.

List of IBM Patents or Patent Applications Treated as Related, 2 pgs.

Quamar, A. et al., "An Ontology-Based Conversation System for Knowledge Bases", SIGMOD (2020), pp. 361-376.

List of IBM Patents or Patent Applications Treated as Related, 2 pgs., 2021.

Mell, P. et al., "Recommendations of the National Institute of Standards and Technology"; NIST Special Publication 800-145 (2011); 7 pgs.

Hurrell et al., "A Conversational Collaborative Filtering Approach To Recommendation", 2013.

Quamar et al., "Conversational BI : An Ontology-Driven Conversation System For Business Intelligence Applications", pp. 3369-3381, Aug. 2020.

Castaldo et al., "Conversational Data Exploration", Apr. 2019.

Li et al., "Towards Deep Conversational Recommendations", Mar. 4, 2019.

Chen et al., "Towards Explainable Conversational Recommendation", Proceedings of the Twenty-Ninth International Joint Conference on Artificial Intelligence (IJCAI-20), pp. 2294-3000, Jan. 2021.

* cited by examiner

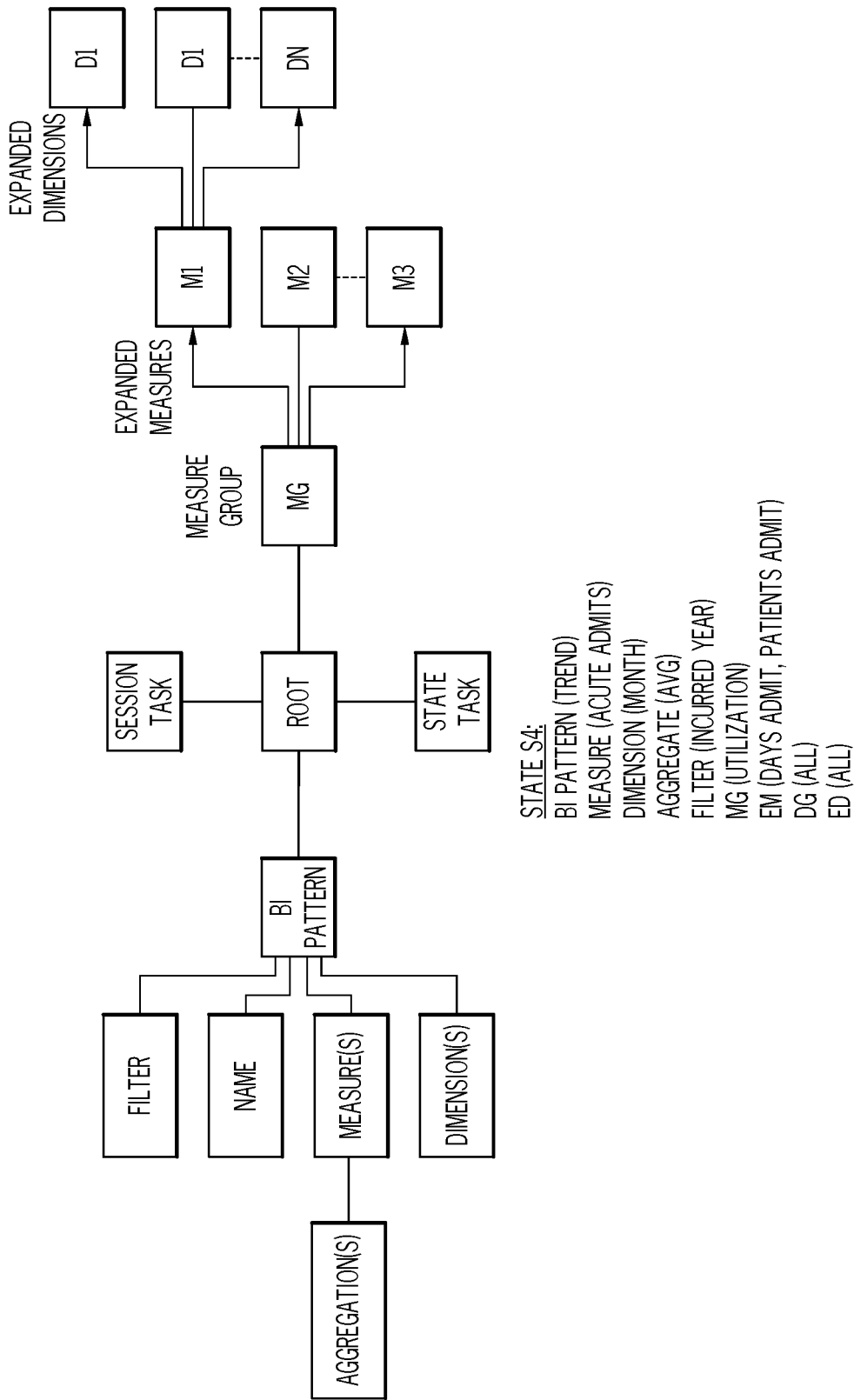

| MEASURE | CO-OCCURRING DIMENSIONS AND FREQUENCIES |
|---|---|
| PATIENTS ADMIT | [(CLINICAL CONDITION ADMIT, 2), (PLAN, 2), (PCP NAME, 1)] |
| NET PAY PMPY ADM ACUTE | [(PROCEDURE CODE PRINCIPAL ADMIT, 31), (PAID QUARTER, 6), (COVERAGE INDICATOR VIDION, 4)]<br>[(INCURRED PLAN YEAR, 3), (PCP NAME], 2), (RACE CODE, 1)] |

FIG. 7

GUIDED EXPLORATION FOR CONVERSATIONAL BUSINESS INTELLIGENCE

BACKGROUND

The present invention generally relates to guided data exploration and more specifically relates to efficiently provide access to business intelligence by predicting possible next queries.

Business intelligence (BI) applications built on an underlying Online Analytical Processing (OLAP) business module enable business users to gain actionable insights from their data for better decision making. Conversational interfaces to BI applications that enable data exploration using a natural language dialog have the potential to democratize access to data for a wide range of business users and personas. However, these interfaces still provide limited support for guiding the users in the process of data exploration and analysis. A majority of data analysis today, still requires skills largely limited to those versed in statistics and analytics. To fully embrace the goal of democratization, it is necessary to provide effective and continuous guidance support in the conversation service to allow exploration and analysis of the data in small incremental steps as the conversation with the data progresses.

SUMMARY

The present invention overcomes limitations with prior art systems of having only the user drive the conversation and the onus to write the correct query. To write the proper query, the user must have familiarity with the data, including the schema and vocabulary. Query writing is tedious and many times requires iterations and statistical and analytic skills. Further, the nature of prior art systems limits the analysis to predetermined data exploration.

To provide effective and continuous guidance support for data exploration, disclosed is a conversational recommendation system for BI applications. At any point in the conversation, the present invention recommends the next best data exploration steps to enable the user to explore the data and efficiently complete desired analytical tasks with few interactions against the database.

According to one aspect of the present invention, a computer-implemented method or process to predict the next query is described. The process begins in which a computing device is granted access to receiving prior user interactions based on corresponding pairs of user queries and computing device responses, with the conversational interface. The process is granted access to a business intelligence ontology. The computing device is granted access to a conversational space structure for the conversational interface. The computing device executes a machine learning model based on prior user interactions, business intelligence ontology, and the conversational space structure to predict possible next queries (data exploration steps). The possible next queries are sent to a user.

In another example, the machine learning model to predict the possible next queries includes possible next queries which are not included in the plurality of prior user interactions.

In another example, the computing device receives a user query in addition to the prior user interactions with the conversational interface. A response to the query is generated. The response to the query is sent to the user before sending the possible next queries, which have been predicted.

In another example, the computing device models a state structure representation mechanism of the plurality of prior user interactions as a sequence of states and a graph embedding learner using Graph Neural Networks to create a compact, low-dimensional representation for each state graph which utilizes embeddings generated by pre-trained language models on label names of individual measures and dimensions as input feature vectors. The machine learning model predicts the possible next queries may use compact, low-dimensional representation for each state graph as input.

In another example, the machine learning model further includes a high-level action predictor for multi-class classification trained on embeddings of prior user sessions to predict a high-level action, consisting of a pattern observed in business intelligence workloads and a session level task. High-level action predictor may include one of a Random Forests, a Long Short-Term Memory (LTSM), a double Deep Q-Network (DQN), or a combination thereof as a multiclass classifier.

In another example, the machine learning model further includes a business intelligence query predictor using collaborative filtering. The collaborative filtering may consist of index-based collaborative filtering, matrix factorization-based collaborative filtering or a combination thereof. Before sending the possible next queries that have been predicted, the possible next queries are further processed using one of data co-occurrence statistics, cardinality estimates, and statistical distribution of the business intelligence data.

According to another aspect of the invention described is a computer-implemented method of using a computing device to provide model training to a conversational interface by mapping a search space to a vector space. The process begins with the computing device receiving access to a plurality of prior user interactions based on corresponding pairs of user queries and computing device responses, with a conversational interface. Next, the computing device also receives access to a business intelligence ontology and to a conversational space structure for the conversational interface. The computing device executes a state graph creator which models prior user sessions as a sequence of states and a graph embedding learner using Graph Neural Networks to create a compact, low-dimensional representation for each state graph which utilizes embeddings generated by pre-trained language models on label names of individual measures and dimensions as input feature vectors.

In one example, the user queries include business intelligence patterns, quantifiable attributes, qualifying attributes, operations on the attributes such as aggregations, filters, group bys, and semantic information from the business intelligence ontology that captures a cube definition of business intelligence data including hierarchies of the quantifiable attributes, hierarchies of the qualifying attributes, relationships between the quantifiable attributes (measures) and qualifying attributes (dimensions). The user queries may include modeling the business intelligence query and relevant semantic information from the BI ontology as a state graph with a state-level task as a root node and capturing structural information, which includes edge connections between the quantifiable attributes, the qualifying attributes, hierarchies of the quantifiable attributes, and hierarchies of the qualifying attributes.

In another example, executing a business intelligence-specific unsupervised loss function that minimizes a difference between a Jaccard similarity of a pair of states in an original space and a cosine similarity computed between a vector space representation of states to train a Graph Neural Network to generate state graph embeddings.

According to another aspect of the invention a computer-implemented method or process of using a computing device to provide access to business intelligence data via a conversational interface is described. The process begins with the computing device be granted access to prior user interactions based on corresponding pairs of user queries and computing device responses, with a conversational interface. Next, the computing device is granted access to a business intelligence ontology and access to a conversational space structure for the conversational interface. The computing device executes a high-level action predictor for multi-class classification trained on embeddings of prior user sessions to predict a high-level action, consisting of patterns in the business intelligence data and a session level task.

In one example, the high-level action predictor includes at one of a Random Forests, a Long Short-Term Memory (LTSM), a double Deep Q-Network (DQN), or a combination thereof.

According to another aspect of the invention, a computer-implemented method or process of using a computing device to provide access to business intelligence data via a conversational interface is described. The process begins, with the computing device being granted access to prior user interactions based on corresponding pairs of user queries and computing device responses with a conversational interface. Next, the computing device is given access to a business intelligence ontology and a conversational space structure for the conversational interface. The computing device executes a machine learning model that includes a business intelligence query predictor using collaborative filtering.

In one example, the collaborative filtering includes one of index-based collaborative filtering, matrix factorization-based collaborative filtering or a combination thereof.

In another example, prior to sending the possible next queries which has been predicted, the possible next queries are further processed using one of data co-occurrence statistics, cardinality estimates and statistical distribution of the business intelligence data.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which:

FIG. 3A thru 3D is an example session, an ontology neighborhood, a state graph representation and an architecture for generating low dimensional vector representation (embeddings) of the state graphs, according to one aspect of the present invention;

FIG. 7 illustrates sample co-occurrence s statistics corresponding to Measures and Dimensions, according to one aspect of the present invention;

DETAILED DESCRIPTION

Figure 1:
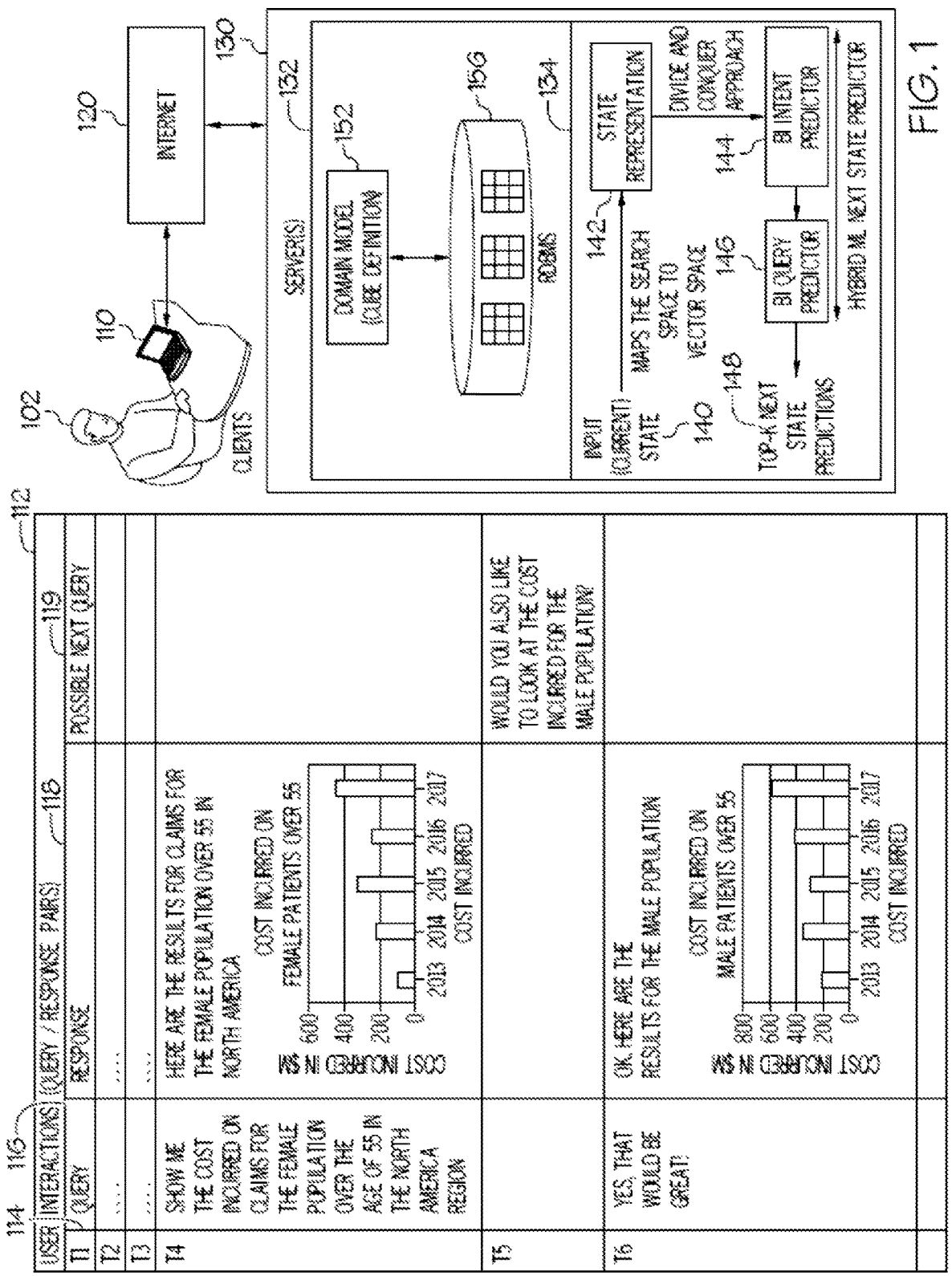
FIG. 1 is a diagram of the overall components and flow of a conversational recommendation system, according to one aspect of the present invention.

This application includes references denoted in brackets, i.e. [ ]. These references are listed in the information disclosure statement (IDS) filed herewith. The teachings of each of these references is hereby incorporated hereinto in their entirety.

Disclosed is effective and continuous guidance support for data exploration by providing a conversational recommendation system for BI applications. At any point in the conversation, the present invention recommends the next best data exploration steps to enable the user to explore the data and accomplish the desired analytical tasks with few interactions against the database. The present invention provides many salient features, including effective and continuous guidance in which the system assists in data exploration through relevant recommendations. The system is an active participant and provides an exploration of data and insights in small incremental steps. Benefits provided by the present invention include a better understanding of the underlying data, alleviate the burden on the user of query writing and understanding the data and skills in statistics and analysis, and better efficiency due to derivation of BI insights with fewer interactions with data.

Non-Limiting Definitions

The term "artificial neural network" or "ANN" is a learning system modeled after the human brain, operated by a large number of processors operating in parallel.

The term "deep neural network" or "DNN" refers to an artificial neural network having multiple hidden layers of neurons between the input and output layers.

The term "embedding" is a relatively low-dimensional space into which high-dimensional vectors may be translated into. Embeddings are particularly useful as inputs to machine learning models for representing large inputs like sparse vectors representing words.

The term "hyperparameters" or "meta parameters" refers to parameters that define properties of the training model, but cannot be learned directly from the process of training the model. Hyperparameters are usually set before the actual training process begins and describe properties such as: the depth of a tree, the rate of learning, the number of hidden layers, or the number of clusters. They are also known as "meta parameters."

The term "model parameters" or "training parameters" refers to the parameters in a machine learning model. Model parameters are learned from training data.

The term "user interactions" refers to a corresponding pairs of user queries and computing device responses i.e. a pair of queries and associated responses in a conversational system.

Invention Description

The present invention builds upon the inventor's previous work on conversational BI [1], which describes a new and novel technique to create a BI ontology from a business module that provides an entity centric view of the cube definition over the underlying data in terms of relevant measures (quantifiable attributes), dimensions (qualifying attributes), their hierarchies and relationships. The present invention uses the ontology to bootstrap the conversation service. The present invention includes a conversational recommendation system for guided data exploration, which leverages several different inputs and techniques to model the search space for making meaningful recommendations to the user. These include the rich semantic information in the BI ontology, interaction logs with the conversational system to benefit from prior user experience, data statistics, distribution patterns and the conversational context that captures the user's current state of data exploration. Prior user interactions are captured as user sessions where each session is represented as a series of states triggered by actions in terms of BI operations such as a BI analysis query, drill down, roll-up, pivot, etc. Given a sequence of states in a data exploration session, the top-k actions as BI queries are recommend to the user that s/he might be interested in. Graph Neural Networks (GNN) are used to create a compact, low-dimensional representation of each state in a data exploration session. A novel two-step approach is described to divide and conquer the huge search space of data exploration. This approach exploits the fact that each user session can be associated with a high-level BI analysis task that the user is interested in. The first step in this novel approach predicts a high-level action (BI Intent) in terms of a BI operation and a session level task. Several different machine learning (ML) or deep learning models are deployed for multi-class classification. These models are trained on the embeddings of prior user sessions to predict a high-level action. In the second step in this novel approach, this high-level action is then further refined into a set of top-k detailed BI query recommendations using a collaborative filtering approach. Finally, the conversational recommendation systems refines the recommendations using data co-occurrence statistics, cardinality estimates, and statistical distribution of underlying data. The inventors have experimental results that illustrate that both the search space representation and online query prediction steps are effective in recommending a set of top-k BI queries with high accuracy. These experimental results are available by request and may be published soon.

The conversation recommendation system proactively guides a user of a Business Intelligence (BI) application, by recommending the next best data exploration steps the user can possibly follow during an OLAP session, in order better understand the data set and derive interesting business insights.

Turning now to FIG. 1, shown is a diagram of the overall components and flow of a conversational recommendation system 100. Shown is a client device 102 communicatively coupled over a communications infrastructure 120 to one or more servers 130. A client device can include a wireless device (e.g., a smartphone, a smart speaker, and other wireless communication devices such as tablet computers), a laptop/computer, a desktop computer, and other information processing systems.

Shown is an example conversation sequence 112 representing a conversational interface between a user using a client device 110 and servers 130 operating the conversational recommendation system 132 operating on servers 130. The first column 114 denotes an example time sequence T1, T2 . . . . At time T4, a user interaction, i.e. query 116 and system response pair 118 is shown. Notice that possible next query 119 predicted by the conversations recommendation system 132. Although the conversational sequence is shown as primarily text sequence with graphs, examples of the present invention can employ speech recognition and speech synthesis to replace all or portions of the text interface.

The conversational recommendation system 132 includes a domain model 152, which can include but is not in any way limited to, for example, a business model, a healthcare model, a travel model, a finance model, a weather model, etc., that may be arranged in a cube definition. A database management system (DBMS) 154, which may be a relational DBMS, stores underlying data that will be used to create the domain model 152. In the creation of a domain model 152, a cube definition is a more efficient way to create the domain model from the data because the cube definition provides data analysis DA specific information, such as quantifiable, qualifying or categorical attributes, their hierarchies, and how they are related.

The architecture 134 of the conversation recommendation system incorporates the following innovations:

1) The inputs 140, such as the queries in a BI OLAP session, are modeled as state graphs 142 and derive a state representation that effectively maps the search space of possible next queries to a latent space. BI Query logs 320 are pre-processed offline and provide inputs for training an online recommendation system. The offline processing step includes two components— (1) a state graph creator 326 which models prior user sessions as a sequence of states. It utilizes the rich semantic information in the BI ontology, to derive a directed graph for each state, (2) a graph embedding learner using Graph Neural Networks 328 to create a compact, low-dimensional representation for each state graph which utilizes pre-trained language model such as BERT [2] embeddings 324 on label names of individual measures and dimensions as input feature vectors.

2) The online recommendation system utilizes a two-step approach to divide and conquer the huge search space of data exploration which depends on the cardinality of possible combinations of BI patterns, dimensions and measures. The huge search space of next best queries is to be recommended to the user is reduced by adopting a two-step approach. This obviates the need for one-shot prediction of the entire query, which is a difficult problem to learn for the ML/Deep Learning models both in terms of representing the search space of all possible queries and predicting them. This unique two-step approach, first predicts the high-level action that the user might be interested in, using a high-level action predictor 144. A number of different models are utilized for multi-class classification such as Random Forests [6, 7], LSTMS, Reinforcement Learning based Double DQN Networks, etc. trained on the embeddings of prior user sessions to predict a high-level action, consisting of the BI operation and a session level task only. Subsequently, the full BI query is predicted using a BI query predictor 146 using a collaborative filtering approach. The pair of Machine Learning (ML) algorithms used for high-level action prediction and full BI query prediction is termed as a Hybrid ML Model. Given a sequence of states in a data exploration session, the top-k next best actions as BI queries 148 are recommended to the user that s/he might be interested in.

3) The experimental results illustrate that both the offline processing and online recommendation steps are effective and can represent as well as predict the detailed BI query with a high accuracy. As previously mentioned, these experimental results are available by request and may be published soon.

A. State Representation

The search space for recommendations consists of prior user interactions captured as a set of sessions each consisting of a sequence of states. Each state consists of the BI Query pattern, and the measures, dimensions, filters, and aggregations involved in the BI pattern. The state is further augmented with additional semantic information from the BI ontology in terms of additional measures and dimensions relevant to the query state.

One novel aspect of the invention is that the Business Intelligence (BI) queries are represented as state graphs in order to capture the structural information within the queries. The structural information pertinent to the state representation is available in the ontology which captures the semantic information from the domain schema pertinent to BI analysis.

Turning now to FIGS. 2A thru 2D shown is a measure hierarchy and dimension hierarchy in the BI ontology for a healthcare dataset. More specifically shown in FIG. 2 a snapshot of the BI ontology for the health insights application [8]. The details of the application will be described further in Section D.1.a below. Although a health insights application is used in these examples, it is understood that the presently claimed invention is not limited to healthcare or this data set example.

The enriched ontology is shown in a suite-generated ontology snapshot. The bracketed meta-concepts 202 provide a logical grouping of the measures, and the actual measures 204 are stored in the underlying database. In the particular example illustrated in FIG. 2A, the financial measures 206 includes a logical grouping of allowed amounts 208, submitted charges 210, net payments 212, allowed rates 214, and net pay rates 216.

Figure 2A:
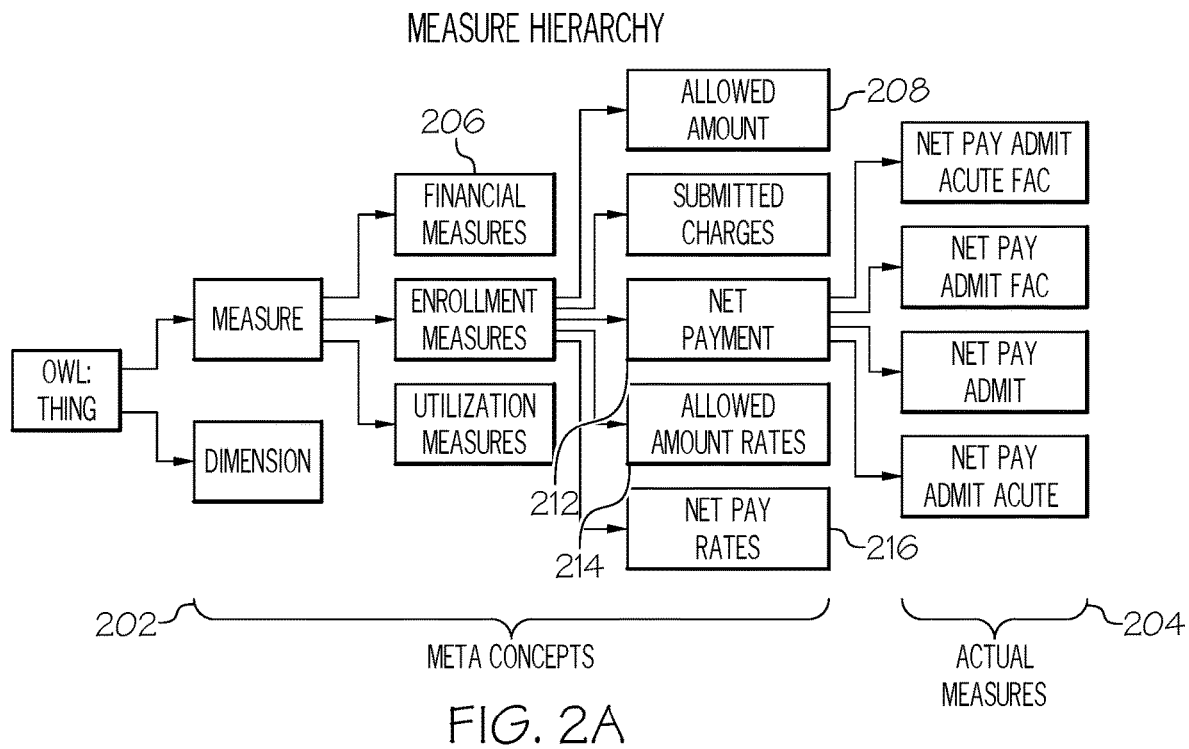
FIGS. 2A thru 2D describe the measure hierarchy and dimension hierarchy in the BI ontology for a healthcare dataset, according to one aspect of the present invention.

The ontology shown in FIG. 2A contains the measure hierarchy and dimension hierarchy. While measures (M) are defined as the quantifiable entities in the underlying database, and mostly used as the projected attributes in a query, dimensions (D) are the qualifying attributes which are used in "group by" and "filter" (F) or selection predicates. The dimensions and measures are further organized in a hierarchical fashion that clusters them under high-level meta-concepts. The meta-concepts are further abstracted into collections of meta-concepts all the way until the root node.

Figure 2B:
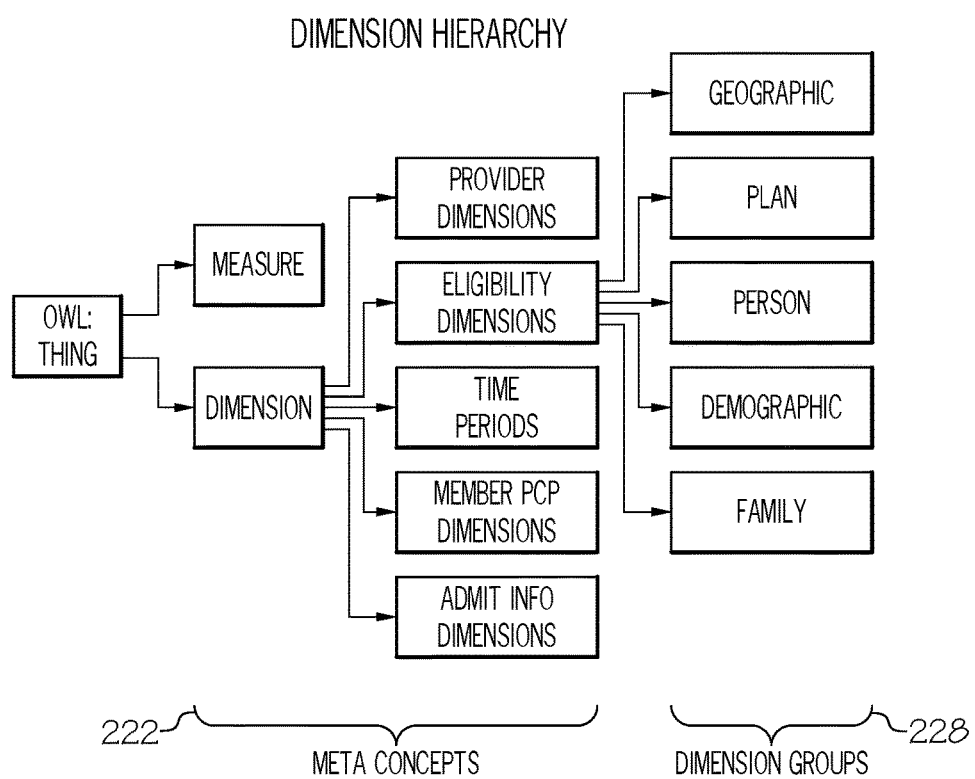
Figure 2C:
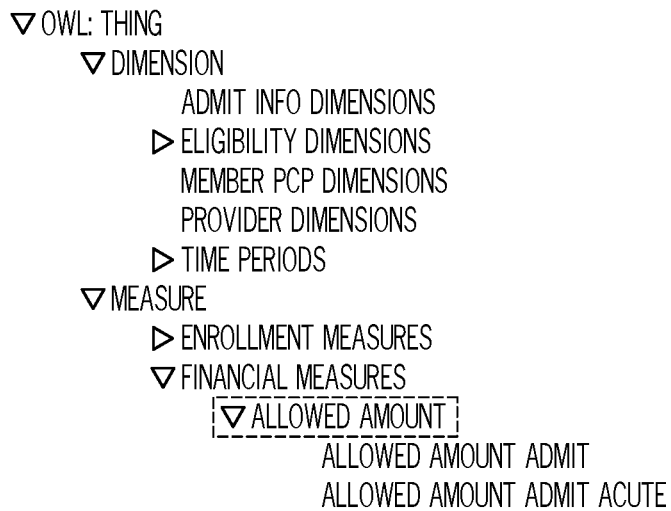
Figure 2D:
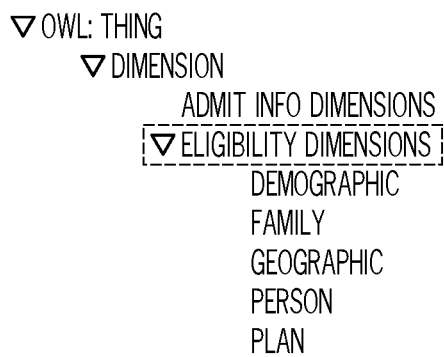

Shown in FIG. 2B are grouped meta-concepts 222 and the qualifying or categorical attributes group 224. An algorithm captures the information and models the quantifiable entities, categorical or qualifying attributes, hierarchies, relationships, and other relevant attributes as concepts, data properties, and object properties in a Web Ontology Language (OWL). The meta-concepts provide a logical grouping of the qualifying or categorical attributes that are stored in the underlying database.

The meta-concepts at the first level from the bottom of the tree, just above the individual measure or dimension leaf nodes are called Measure Groups (MG) 222 and Dimension Groups (DG) 224 respectively as shown in FIG. 2B. Also, the measures and dimensions are connected by edges representing relationships among them that keep track of compatible pairs of entities which can co-occur in a BI query. The semantic information present in the ontology is utilized by not only capturing the BI patterns (BI), measures (M), dimensions (D) present in the query, but also their expanded neighborhood. The expanded set of measures are defined as the siblings of the queried measures in the ontological hierarchy that share a common measure group (MG) FIG. 2C. On similar lines, expanded dimensions are those dimensions that the expanded measures are connected to, in the ontological graph FIG. 2D. Shown here is the visualization of the standard OWL format used to represent rich and complex knowledge about entities, groups of entities, and relations between entities.

Including this information about the expanded neighborhood is useful in two ways:
1. A relaxed representation is derived for the states (queries) that allows the capture of the similarity between proximal queries. This is because, for a pair of states to be similar, it is no longer necessary for the states to contain the exact same elements. Two states which have measures or dimensions falling under the same measure or dimension groups can be similar as well.
2. At the time of recommending the next BI query to a user, the conversational recommendation system does not have to restrict itself to picking a query from the prior workload. Rather, the conversational recommendation system can recommend a query based on the expanded neighborhood that allows it to synthesize unseen but similar queries.

Figure 3A:
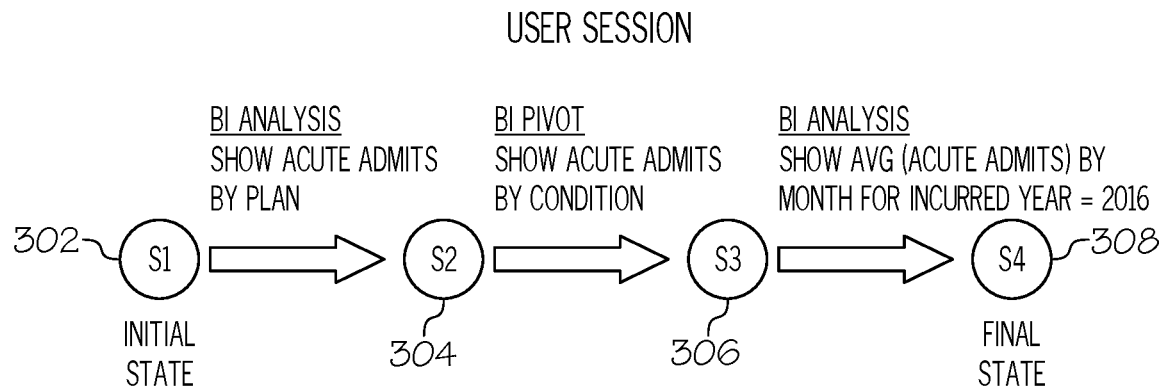
Figure 3B:
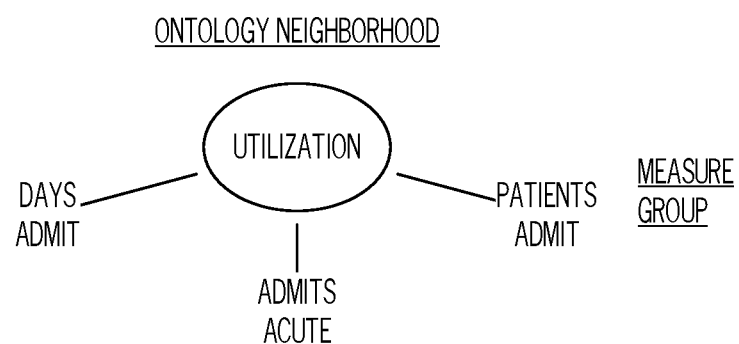

Turning now FIG. 3 shows a sample session containing a start state S1 302 and three subsequent states, from S2 to S4 (304 thru 308), corresponding to three BI queries in FIG. 3A. In order to predict S5, each of the states from S1 to S4 are modeled as a state graph. FIG. 3C shows how the state S4 is represented as a graph. Notice from S4, the BI pattern is "BI Trend" implying that the "group by" dimension is temporal, which happens to be "month" in S4. Likewise, the measure is "Acute Admits" upon which an aggregate (AVERAGE) is applied, and the filter (selection predicate) is applied on the "Incurred Year" dimension. Besides this, notice from the ontological neighborhood (FIG. 3B) that "Acute Admits" occurs under a measure group (MG) named "Utilization" which has a few more descendants (siblings of Acute Admits) such as "Days Admit" and "Patients Admit". These siblings are referred to as "Expanded Measures" (EM) and the dimensions that they are connected to, are termed "Expanded Dimensions" (ED). Also the information is recorded about the dimension groups (DG), that these expanded dimensions fall under.

In addition to running the aforementioned expansion procedure, the system also identifies the state-level task for each state and session-level task for each user session to identify the high-level analysis task the user is interested in as shown in FIG. 3C. The state-level task is represented as the queried measure in the respective state and the session-level task as the set union of measure groups that the queried measures in a session fall under. This is because, the queried measure is the most representative information that a user is interested in, and it suggests the high-level information the user is looking for. BI analysis is typically characterized by users looking at a specific measure which they slice and dice along several dimensions and their hierarchies to gain useful insights looking at different subsets and their corresponding distributions of data.

Different options are considered for the vectorized representation of each state in a data exploration session. These include:

(1) Representing each BI State as a set. This involves the representation of each BI query as a set of its constituent elements. A popular method that is applied to derive a set representation is one-hot encoding, which represents each element as a Boolean feature in the feature vector which if set to 1 indicates the presence of that element in the BI query and its absence if the feature is set to 0. There would be as many features as the number of elements which are—BI Patterns (BI), Measures (M), Dimensions (D), Aggregates (A), Measure Groups (MG), Dimension Groups (DG), Expanded Measures (EM) and Expanded Dimensions (ED). However, the representation of the state using one-hot encoding has the following limitations:

a) One-hot encoding is extremely sparse when the dimensionality of the possibly occurring elements within the BI query is huge, which happens to be the case with huge domain schemata.

b) One-hot encoding cannot represent the structural information within the BI query—for instance, information about the connections between measures and dimensions, measures (or dimensions) and their parents such as measure groups (or dimension groups).

(2) Representing each BI state in the session as a graph. This involves the structural representation of each BI query as a graph that connects its constituent elements. Two categories of elements in the state graph shown are shown in FIG. 3C—elements which are queried by the user and the expanded elements which occur in the ontological neighborhood of the queried elements. The state level task node (defined above) becomes the root node and is connected to both the queried elements and the expanded elements. Here, nodes represent the elements and edges represent the relationship between them. The edges are directed to represent the structural dependence within the BI query—for instance, aggregates can only co-occur with measures in a query which necessitates an edge from measures towards the applied aggregates. Likewise, the measures, dimensions and filters have a meaningful existence in a query only when they co-occur with a BI Pattern node that represents the applied operation in the query. In the case of expanded neighborhood, measure groups are parents of measures which are connected to the dimension groups. The dimension groups are in turn parents of the expanded dimensions. Thus, the directed edges within the expanded neighborhood denote both hierarchical relationships and the connections among the elements. After encoding the graph BI query as a graph, a Graph Neural Networks (GNNs) can be used to convert the graph into a vector representation. In one example BERT embeddings [3] learned by a pretrained model on Wikipedia are used to provide the input feature vectors for each node in the state graph.

Figure 3D:
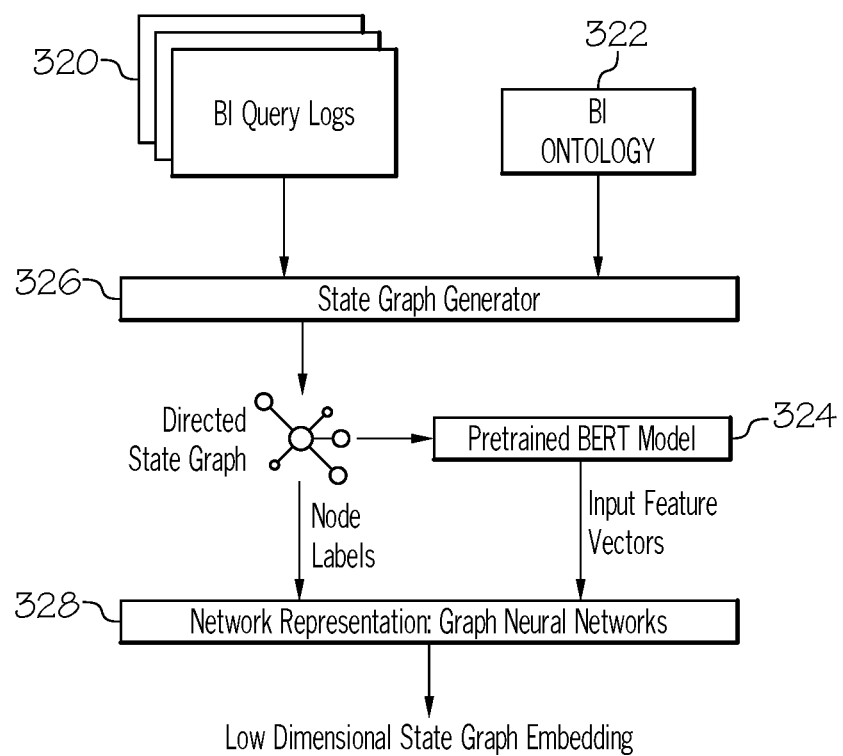

Following is a description of the state graph representation architecture in FIG. 3D.

1) Pre-processed BI query logs are provided as input to the state graph generator. As a pre-processing step, the raw logs are cleaned by eliminating any session whose length (# queries) in the session is less than 3, i.e., # state transitions (which is #queries −1) is less than 2.

2) In order to represent each node in the state graph, embeddings [3] generated by pre-trained language models such as BERT are used which generate the numerical feature vector representations of the node labels.

3) The state graph generator 326 creates the state graph based on the elements within the BI query and the expanded neighborhood derived from the ontology neighborhood 322. Embeddings of the node labels generated using a pre-trained language model such as BERT are used as input feature vectors 324.

4) A state task node is generated that acts as a root node (or a virtual node) in the state graph. It is connected to both the queried elements as well as the expanded neighborhood as shown in FIG. 3C.

5) A multi-layer Graphsage [2] is used as the Graph neural network (GNN) along with the pooling mechanism to generate the graph embedding.

6) In order to train the Graphsage, randomly sampled pairs of queries from the training set are used in conjunction with a unsupervised loss function that minimizes the difference between the similarity values of the pairs in the original space and the vector space. Jaccard similarity is used between the BI pattern, measures (with aggregates), group by dimensions and filter dimensions from the BI queries in the pair to derive the original space similarity. Cosine similarity is computed between the graph embeddings of the queries to derive the vector space similarity. The loss is back-propagated from the output layer to train the GNN. Following is a mathematical representation of the loss minimization objective function:

$$\min \Sigma_{i,j \in Pairs} |\text{JaccardSim}(S_i, S_j) - \text{CosineSim}(V_i, V_j)|$$

In the above equation, i and j denote indices of the states $S_i$ and $S_j$ in a randomly drawn matching or non-matching state pair from the Cartesian product of state pairs, denoted by "Pairs". $V_i$ and $V_j$ denote the latent vectors or the graph embeddings of $S_i$ and $S_j$ respectively. The objective function minimizes the cumulative difference between the Jaccard similarity (computed upon the states) and the cosine similarity (computed upon the vectors) over several such pairs.

Using the graph representation approach has the following advantages:

(a) It captures the structural information among the elements within a BI query, (b) Allows us to leverage the state-of-the-art graph neural network techniques to generate compact state embeddings with a dimensionality of our choice that addresses the sparsity issue.

B. High-Level Action Prediction

Figure 4A:
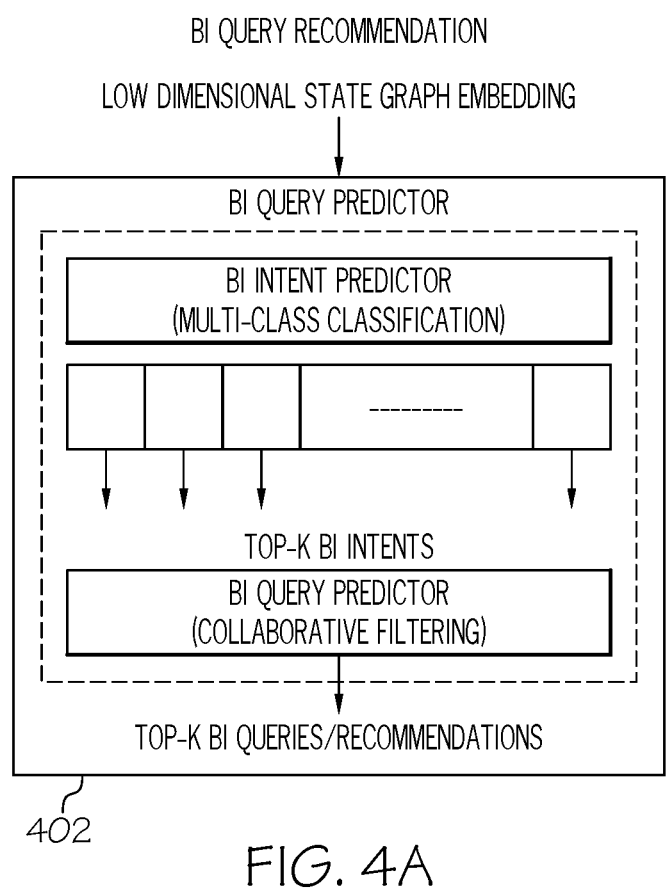
FIG. 4A thru FIG. 4B illustrates a two-step architecture for online BI query recommendation machine learning model and the possible BI Intent (high-level action) predictors, according to one aspect of the present invention.

As shown in 134 of FIG. 1, a hybrid ML model is used to divide and conquer the huge search space of possible next BI queries in a session. A BI Intent (high-level action) is first predicted using a BI Intent predictor 144, and subsequently predict a full BI query using a BI query predictor 146 as shown in FIG. 4A. The combination of the two ML predictors is termed as the Hybrid ML model.

The high-level action is the combination of BI pattern and the measure group. Two entities are chosen to represent the BI Intent for the following reasons:
1) BI Operation or Pattern indicates the broad action that is applied by the BI query and it can be any of the following seven patterns—"BI Analysis", "BI Comparison", "BI Roll-up", "BI Drill-Down", "BI Pivot", and "BI Trend". While roll-up, drill-down, pivot and trend represent the operations performed upon the dimension, analysis and comparison predominantly focus on the measure that is projected by the BI query.
2) As previously mentioned, the set union of measure groups, that the queried measures from all the BI queries within a session belong to, represents the session-level task. Including the measure group inferred from a BI query within the high-level action helps in capturing the session-level task relevant to the query.

Therefore, BI pattern and measure group prediction gives us a high-level idea of what the next BI query is about, and helps significantly narrow down the search space.

Several different ML models are considered as candidates for high-level action prediction which essentially is a multi-class classification problem. These include the Random Forest model, LSTMs for sequence classification as well as Reinforcement Learning models using Double DQN [4]. These candidate ML models are selected because they capture diverse information while predicting the high-level action. While random forests model the prediction task as a multi-class classification task upon the state vector, LSTMs can capture the context of the entire sequence of states up until the current state. Reinforcement learning can model the prediction task as the selection of an optimal action given the state information, using appropriate reward functions to quantify the conditional effectiveness of various actions under a given state. A combination of random forests and LSTM is also used for sequence classification. While LSTMs produce latent vectors of uniform dimensionality for variable length input sequences, random forests consume those latent vectors as input to predict the BI Intent as a class label prediction. This model enables the usage of random forests as sequence classifiers.

Figure 4B:
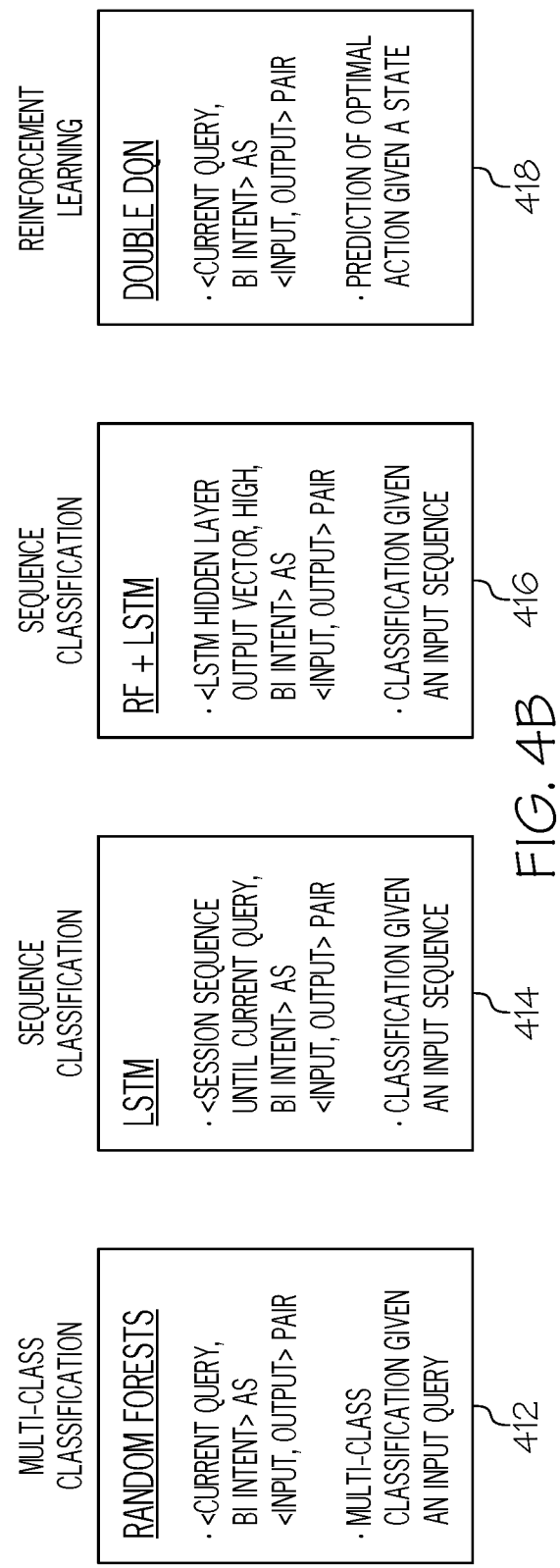

FIG. 4A shows the two-level architecture for a hybrid ML model. The high-level action is predicted by consuming the state graph embedding as input. Further details on how to make use of the predicted BI Intent to predict the detailed BI query, later in Section C. FIG. 4B shows the four diverse ML candidates that implemented as BI Intent predictors 402 along with the <input, output> format of pairs they use during the training phase.

Figure 5A:
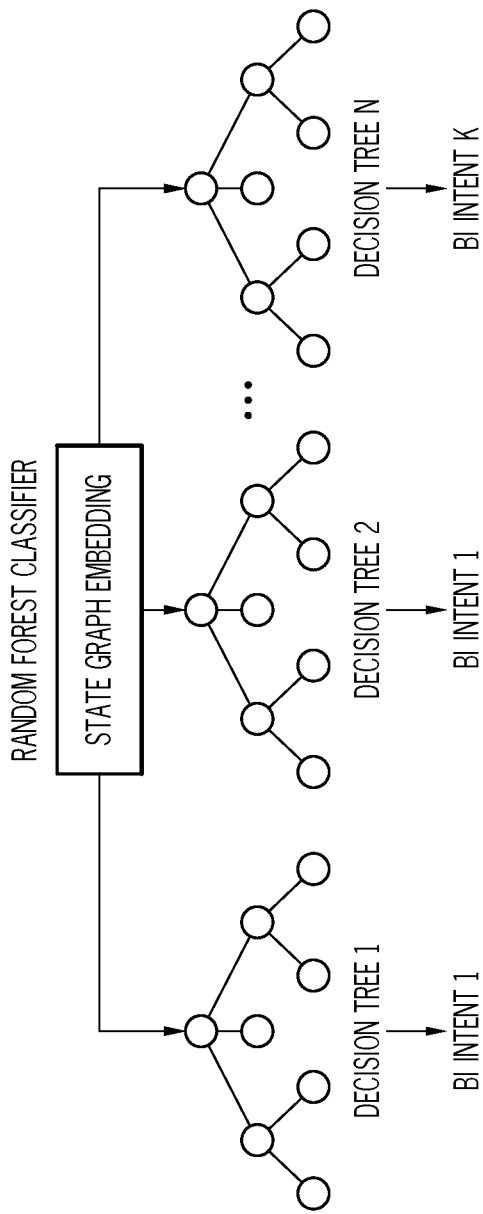
FIG. 5A thru FIG. 5D illustrates a Random Forest (RF), LSTM, LSTM-RF and a Reinforcement Learning Classifier based on double Deep Q-Network (DQN) architecture, used for high-level action prediction, according to one aspect of the present invention.
Figure 5B:
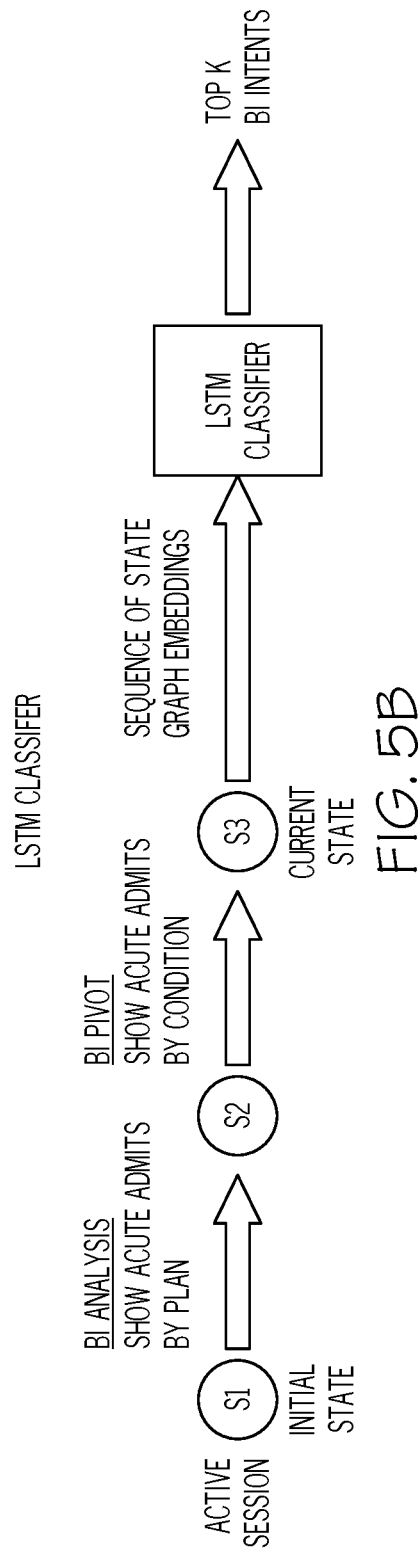
Figure 5C:
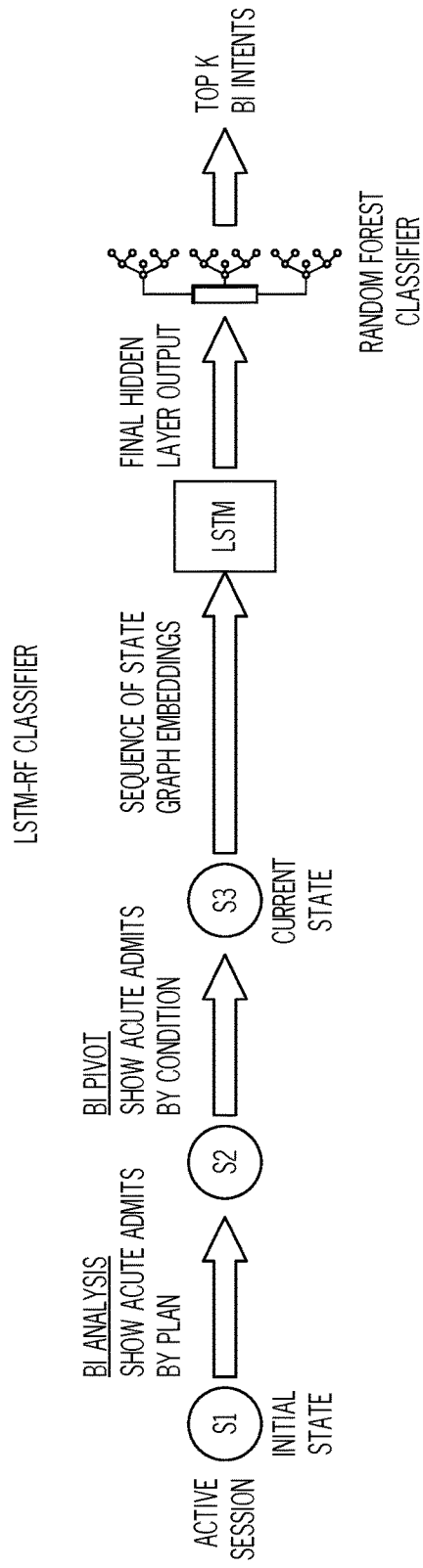
Figure 5D:
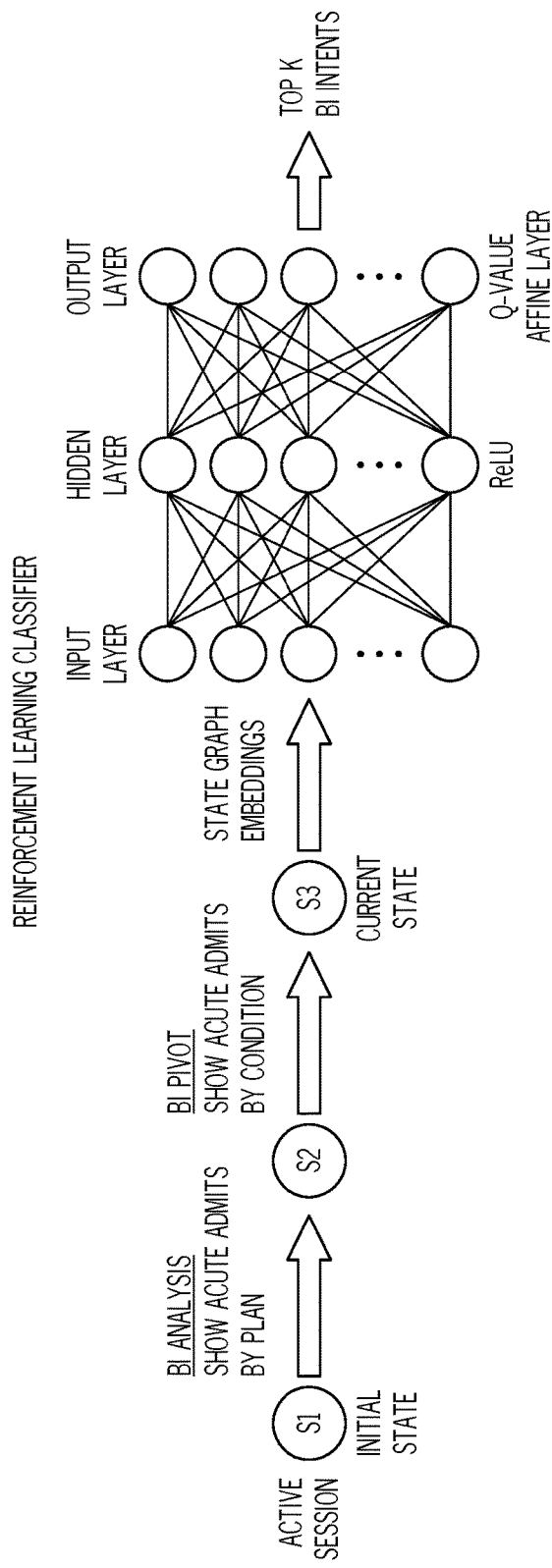

Each of candidate BI Intent predictors is described below:
a. Random Forests 412 and FIG. 5A take the state graph embedding for the current query (which is the last query in the current session) as input and predicts the BI Intent as output class.
b. LSTMs (Long Short-Term memory) 414 and FIG. 5B take the sequence of state embeddings for all the queries so far in the current session as input and predict the BI Intent as output class. A LSTM architecture is used with a softmax layer at the end and negative log likelihood loss function that is typically used for multi-class classification tasks.
c. A combination of random forests and LSTM (RF+LSTM) 416 and FIG. 5C may also be used as a possible candidate for BI Intent prediction. An LSTM consumes a sequence of state embeddings for all the queries so far in the current session as input. The difference between using LSTM as a sequence classifier and RF+LSTM as a sequence classifier is that, in the former, LSTMs are used to directly predict the output class, but using the latter, the output vector is taken from the LSTM hidden layer (without applying the softmax) and fed as the input vector to random forests which produce the final classification output as the BI Intent. In another example a many-to-one LSTM is used which consumes the sequence of state embeddings as input and produces a single hidden layer output vector.
d. For reinforcement learning, a Double DQN [4] 418 and FIG. 5D as the value network may be used. Following is the architecture may be used for Double DQN (Deep Q-Network).

Unlike traditional value networks in Reinforcement Learning which work in an unsupervised setting, the reinforcement learning architecture in this example is customized for a supervised learning setting using a workload of prior user sessions. The state graph embedding of the current query is used as input to predict the appropriate BI Intent. Notice from the architecture of Double DQN in FIG. 5, a parameterized # hidden ReLU layers and an affine layer at the output to capture the Q-values are used. The dimension with the highest Q-value among all the dimensions in the output layer is predicted as the high-level action.

Following are the steps applied to train the Double DQN.
1) The user session logs from the training set are accessed and played in sequence to learn the Q-values for the <state, action> pairs. The number of actions is the product of the number of BI patterns and the number of measure groups in the underlying dataset. (7 BI patterns and 12 measure groups) in our healthcare dataset which represent # dimensions in the output layer.
2) For each current state (BI query), a reward of 1.0 is assigned for the action picked from the logs based on a belief that the logs reflect the ideal user intent. For any other random action, the reward is calculated as the Jaccard similarity between the BI pattern and the measure group (MG) between the randomly picked action and the expected next action from the BI logs. The Jaccard similarity incorporates a weighted metric to give higher weightage to MG over BI pattern. Likewise, actions leading to terminating states in a session get higher weightage over intermediate states.
3) The loss is computed as the difference between the expected Q-value that arrives from Bellman equation and the Q-value predicted by the value network.
4) Experience replay coupled with epsilon probabilities is used for random action selection to balance the exploration vs. exploitation trade-off.

C. BI Query Prediction

Collaborative Filtering (CF) [9] for full BI query prediction for the following reasons:
a) CF was designed with the primary motivation of predicting user ratings to items using "memory-based" algorithmic variants popularly known as <user/item>-similarity based CF. In user-user similarity-based algorithms, each user is modeled as a vector of items and similarity between user vectors are used in predicting the unseen ratings. In item-item similarity computation, each item is represented as a vector of users who have rated it, and the similarity between item vectors are used in predicting the unseen ratings. This scenario can be adapted in a straightforward manner to BI query prediction by modeling each session as a vector of BI queries and compute session similarities to recommend queries.

A fundamental limitation of "memory-based" algorithms is that they are exhaustive and can prove to be computationally expensive especially as they can end up computing the similarities among the entire Cartesian Product of user/item pairs. An approximation suggested by the CF literature is through the design of "model-based" algorithms which encode the users and items as rows and columns in a matrix upon which matrix-completion algorithms such as Singular Value Decomposition (SVD) [5] can be applied. This variant of CF can also be easily adapted to BI query prediction by representing sessions as rows and distinct BI queries as the columns in a matrix.

C.1. Variants of CF Implemented for BI Query Prediction

Two variants of CF—index-based CF and matrix factorization-based CF are applied to predict the full BI query based on the predicted high-level action. Index-based CF is similar to the "memory-based" variant of user/item similarity-based CF. The difference is that our index-based CF avoids computing the similarity of each active session with each of the workload sessions. Rather, it relies on using a task-based index together with the BI Intent predicted by random forests to prune the set of irrelevant sessions. On similar lines, matrix factorization-based CF can be treated as a "model-based CF" approach which also exploits the task-based index and BI Intent predicted by random forests to find a set of most similar training sessions to the current test session. Instead of having to factorize the matrix for each test session, the matrix is factorized only once and utilize task-based similarity to find similar training sessions out of which the next BI query may be recommended.

C.1.1—Index-Based CF

Figure 6:
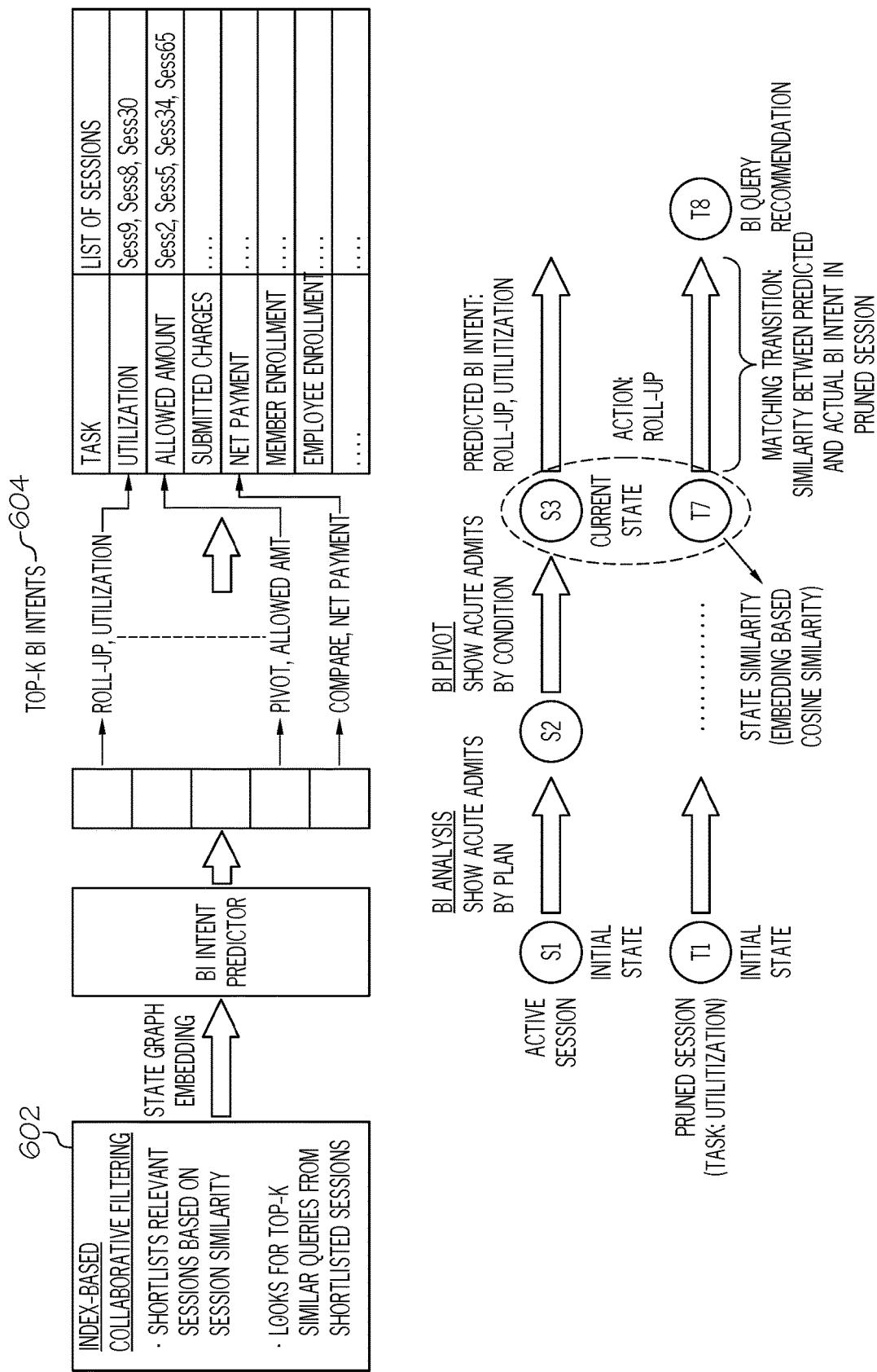
FIG. 6 illustrates an index-based collaborative filtering, including a task based index to identify relevant prior user sessions and similar state identification within the identified session according to one aspect of the present invention.

Described first is the index-based collaborative filtering 602 whose design and architecture is depicted in FIG. 6. Following are the two broad steps in index-based CF which predicts the next BI query, given the current BI query and the predicted BI Intent.

1) The set of matching training sessions which have an overlapping session-level task as the measure group in the predicted BI Intent are used as a shortlist.
2) The training sessions which are on the shortlist are scanned to find the top-k matching historical <state, action> pairs where the state is similar to the current state of user and the action is similar to the predicted high-level action.

As shown in FIG. 6, first a task-based session index is created which is a dictionary of <key, value> pairs consisting of the session-level task (defined as the set union of measure groups queried in a session—see Section A) as the key and the list of sessions having this session-level task as the value. Subsequently the top-K BI Intents predicted by the BI Intent predictor 604 (which happens to be random forests in this case) is matched to the task-based session index, and find the matching sessions for each top-K BI Intent. As shown from FIG. 6, different colors for each top-k BI Intent and infer the shortlisted sessions are used based on the matching measure group between the BI Intent and the key (task) from the task-based session index 606.

Once the matching set of sessions based on the top-K BI Intents are found, the top-K next BI queries for each high-level action are found. Thus, there are two parameters to set. In order to find the top-K next queries, the matching transitions (<Current Query, Next Query>) pairs are detected from the shortlisted sessions whose current query matches the current state from the active session. Following the illustration from FIG. 6, the most recent state from an active session is S4 is identified and it is most similar to T7 from the shortlisted sessions. Likewise, the predicted BI Intent also matches the BI pattern and measure group from T8. Therefore, T8 is suggested as the next BI query to S4. The state similarity is computed as the weighted combination of the Jaccard similarity (0.75 weight) between the BI pattern, measures (M), dimensions (D), filter dimensions (F) and aggregates (A) applied to the measures and the Cosine similarity (0.25 weight) between the latent vectors or state embeddings. The action similarity is Boolean—1.0 if the high-level action is exactly the same and 0.0 otherwise. The top-K next BI queries are sorted upon a weighted combination (0.5 weight for both) of state and action similarities. Following are the equations that show how the aforementioned similarity is computed. Here, $T_{test}$, $S_{test}$, and $A_{test}$ represent a test transition, its corresponding state and action whereas, $T_{train}$, $S_{train}$, and $A_{train}$ represent a train transition, state and action. While JaccSim refers to the Jaccard similarity between the BI elements in the query pair, CosineSim stands for the cosine similarity computed between the vector representation of the state graph embeddings.

$$Sim(T_{test}, T_{train}) = 0.5 \times Sim(S_{test}, S_{train}) + 0.5 \times Sim(A_{test}, A_{train})$$

$$Sim(S_{test}, S_{train}) = 0.75 \times JaccSim(S_{test}, S_{train}) + 0.25 \times CosineSim(S_{test}, S_{train})$$

$$Sim(A_{test}, A_{train}) = 1.0 \text{ if } A_{test} = A_{train}, 0.0 \text{ if } A_{test} \neq A_{train}$$

C.1.2 Approximation of Index-Based CF Using Matrix Factorization-Based CF

Matrix factorization-based CF serves as an approximation to index-based CF as it avoids the extensive <state, action> similarity computed by the latter over the entire list of shortlisted sessions. This method is referred to as SVD-based CF because it uses non-negative matrix factorization based on Singular Value Decomposition (SVD) for collaborative filtering. SVD-based CF sorts the queries based on the completed matrix scores and does not require the computation of <state, action> similarities over all the transitions in the shortlisted sessions before recommending the top-K queries.

Note that the first method requires that the matrix is re-factorized for each test query in every test session, which can turn out to be expensive. Instead, relying on the second method avoids this re-factorization and can use the task-based session index instead to find the closest sessions (rows) from the matrix to the active test session. Given the advantages of the second method over the first in terms of latency, it may be used for BI query prediction.

C.2 Enrichment of Detailed Recommendation Based on Expanded Dimensions

Besides recommending the top-k next BI queries completely based on prior query logs, our recommendations of the detailed BI recommendations may be enhanced further with other top-K BI queries that may also be interesting to the user. Interestingness may be inferred on the basis of—(a) how frequently the user has queried a specific dimension along with a measure in the past, (b) the information gain brought about by the projected bins when sliced by a specific dimension, and (c) how different is the result distribution of the next query as compared to the current query. These reflect user interestingness because, users tend to project specific measures in conjunction with particular dimensions and such co-occurrence frequency is a direct indicator of user interest. Likewise, the information gain (or entropy loss) is characterized by how distinctive the cardinalities of different bins are, which is determined by the group-by dimensions. Users prefer heterogeneous bins that result in higher information gain as compared to bins of homogeneous cardinalities. The third interestingness indicator is surprisingness in the results of the next query as compared to its previous query. Consecutive queries with similar result distributions indicate that the session progression is slow and the user is not deriving much of a new insight as the session progresses. In order to predict the expanded set of queries, three pieces of information may be broadly relied on:

1. Co-occurrence statistics that record pairs of measures and dimensions along with their co-occurrence frequency in the prior workload of user sessions.
2. Cardinality estimates of the underlying data.
3. Surprisingness heuristic computed from the query result distribution.

C.2.a. Co-Occurrence Statistics

As mentioned before, if a dimension has been found to be frequently co-occurring with a specific measure in the past, such a pair of <measure, dimension> is of substantial interest to the user. Recommending such a frequently co-occurring dimension in conjunction with a measure in the future may result in synthesis of a query that is highly likely to be accepted by the user. FIG. 7 shows an example of how the co-occurrence statistics are stored as a dictionary consisting of the measure (M) as the key and the dimensions (D) that appeared along with the key in the training set of prior query logs along with the co-occurrence frequency as the value. After the top-K most likely next queries are detected for a top-K BI Intents, these top-K recommendations may be expanded upon by inferring the inferred set of dimensions. To understand how this inference works, please refer to the following example.

Consider that for a top-K predicted high-level action, <BI Pivot, Net Payment>, one of the top-K predicted next query from the historical workload is "Show Net Pay PMPY Adm Acute by Incurred Plan Year". Notice from FIG. 7 that the most frequently co-occurring top-2 dimensions with the measure Net Pay PMPY Adm Acute are Procedure Code Principal Admit and Paid Quarter. Using these two expanded dimensions as replacements candidates for dimension, two more queries can be synthesized as following:

"Show Net Pay PMPY Adm Acute by Procedure Code Principal Admit"
"Show Net Pay PMPY Adm Acute by Paid Quarter"

The above example shows a third parameter to set which is the number of top-K expanded queries synthesized from the inferred dimensions resulting from the enrichment process. Therefore, besides the top-K BI Intents and the top-K next queries for each BI Intent, there is also a parameter that specifies the number of top-K inferred dimensions.

C.2.b Cardinality Estimates

Dimensions are used in "group by" clauses to slice and dice the projected measures. Expanded dimensions can be selected that produce more concise results, while also reducing the entropy and maximizing the information gain. If there are a few distinct values for a dimension, it helps in enhancing conciseness as it is easy for a user to visualize such results and draw insights from them. On similar lines, dimensions that maximize the information gain and minimize the entropy may be selected. For example, if the aggregated output values for a few bins are observed to be significantly higher than the others, the information gain is high due to the heterogeneity, thus making that dimension interesting. Those dimensions that produce homogeneous bins with uniform aggregate output values in the result visualization via histograms can be safely ignored, as they do not produce significant insights.

C.2.c Statistical Distribution

Expanding upon the recommended dimensions can also happen on the basis of statistical distribution of the results. Surprisingness can be measured based on the KL-Divergence between the result distribution of the predicted next query as compared to the result distribution of the current query. Those expanded dimensions and synthesize recommendations (BI queries) that maximize the KL-Divergence are selected, thereby enhancing the surprisingness in the results of the predicted query and helping the user gain interesting insights.

Overall Flow

Figure 8:
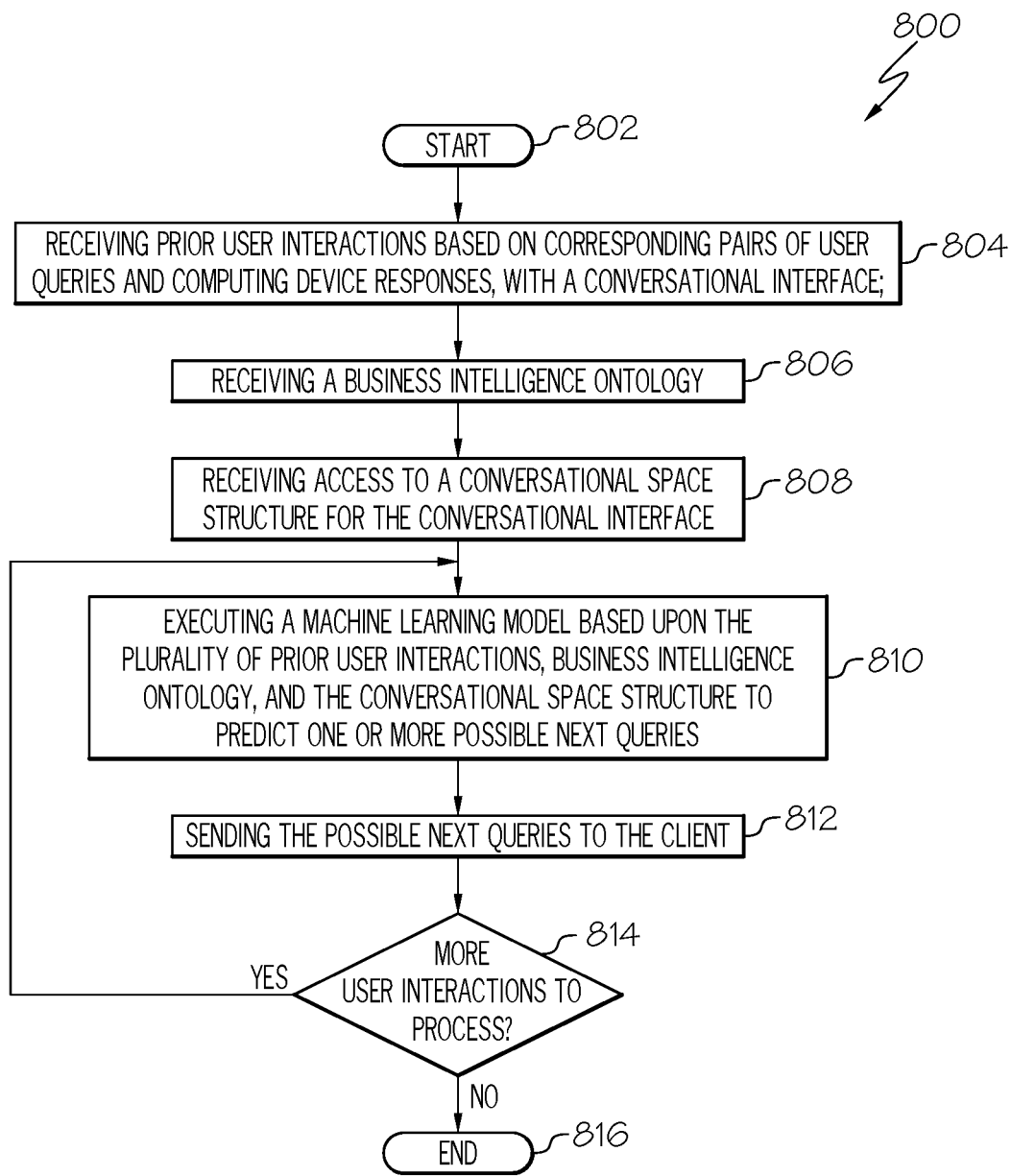
FIG. 8 is a high-level flow chart of the method to predict the next query, according to one aspect of the present invention.

FIG. 8 is a high-level flow chart 800 of the computer-implemented method or process to predict the next query, according to one aspect of the present invention. The process begins in step 802 and immediately proceeds to step 804 in which a computing device is granted access to receiving prior user interactions based on corresponding pairs of user queries and computing device responses with the conversational interface. The process continues to step 806. In step 806 the process is given access to a business intelligence ontology. The process continues to step 808. In step 808 the computing device is granted access to a conversational space structure for the conversational interface. The process continues to step 810. In step 810, the computing device executes a machine learning model based on prior user interactions, business intelligence ontology, and the conversational space structure to predict possible next queries. The process continues to step 812

In step 812, the possible next queries are sent to a user. In another example, the machine learning model to predict the possible next queries includes possible next queries which are not included in the plurality of prior user interactions.

In one example, the computing device receives a user query that is in addition to the prior user interactions with the conversational interface. A response to the query is generated. The response to the query is sent to the user before sending the possible next queries which have been predicted. The process continues to step 814. In step 814, a test is made to determine if more user interactions are received. In the case that more user interactions are received, the process returns to step 810. Otherwise, the process ends in step 816.

Example Computer System

Figure 9:
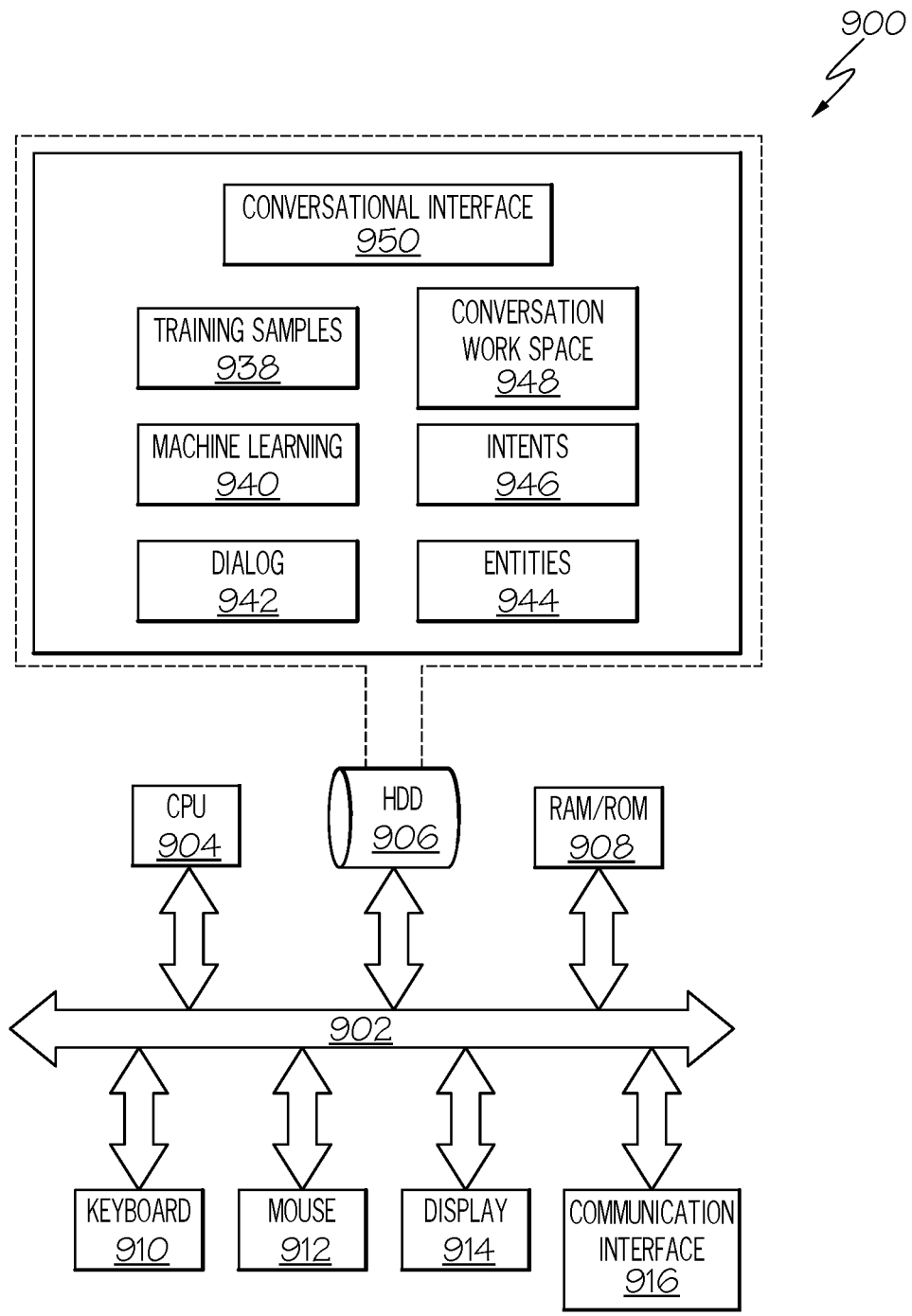
FIG. 9 is a functional block diagram illustration of a computer hardware platform, according to one aspect of the present invention.

FIG. 9 is a functional block diagram illustration of a computer hardware platform that can communicate with various networked components, according to one aspect of the present invention. In particular, FIG. 9 illustrates a particularly configured network or host computer platform 900, as may be used to implement the method for leveraging simple model predictions for enhancing performance shown in FIGS. 1 thru 8.

The computer platform 900 may include a central processing unit (CPU) 904, a hard disk drive (HDD) 906, random access memory (RAM) and/or read-only memory (ROM) 908, a keyboard 910, a mouse 912, a display 914, and a communication interface 916, which are connected to a system bus 902. The HDD 906 can include data stores.

In one embodiment, the HDD 906, has capabilities that include storing a program that can execute various processes, such as for executing a conversational interface 950, in a manner described herein. The conversational interface 950 includes a conversation space 948 including an intents module 946, an entities module 944, and a dialog 942. There can be various modules configured to perform different functions that can vary in quantity.

For example, a training sample module 938 stores various data to train the conversational space 948 via a machine learning module 940 configured to perform machine learning regarding utterances, and learning the intent of new or updated utterances.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

As will be appreciated by one skilled in the art, aspects of the present invention may be embodied as a system, method, or computer program product 1090 at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Example Cloud Platform

Figure 10:
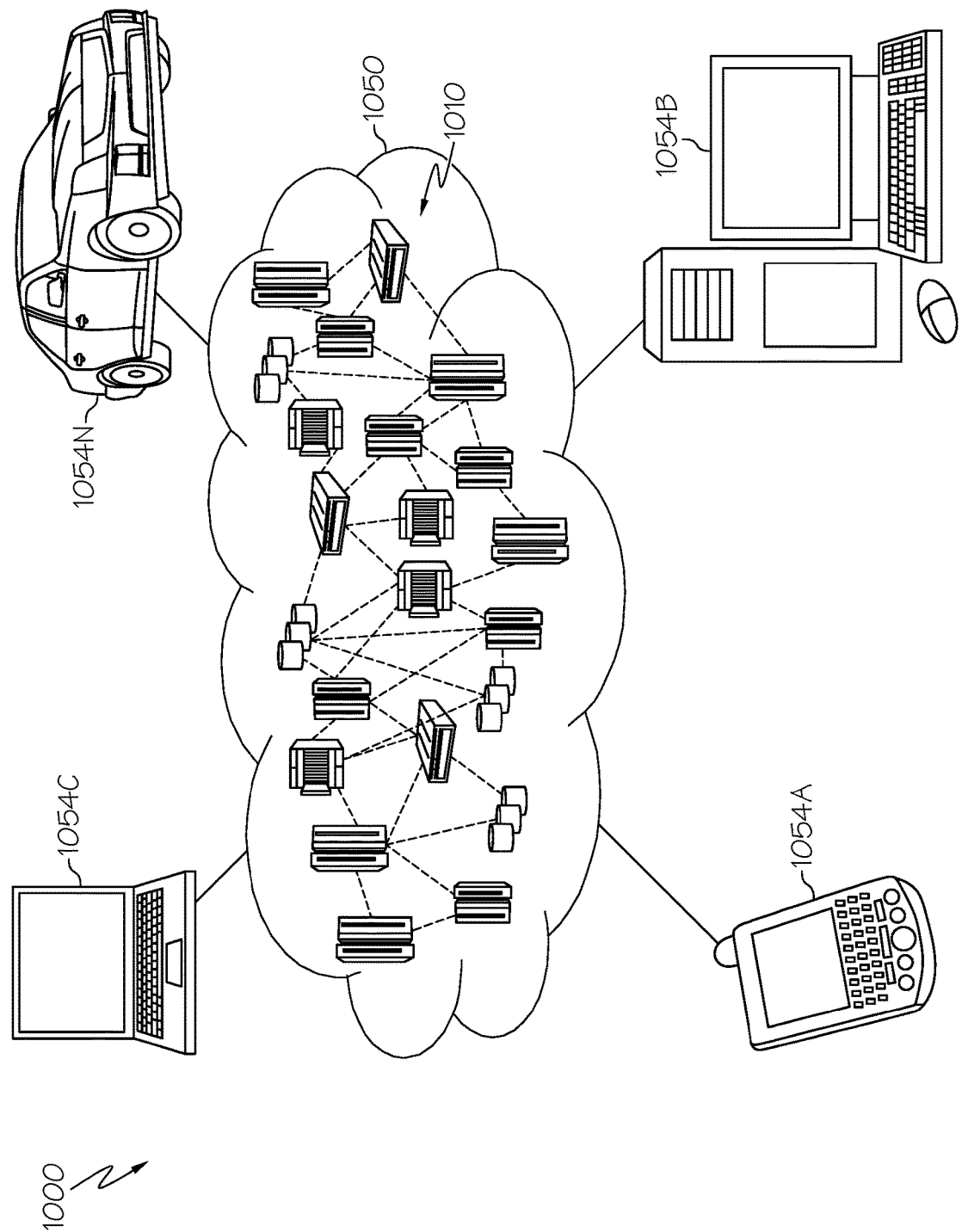
FIG. 10 depicts an illustrative cloud computing environment utilizing cloud computing, according to one aspect of the present invention.

As discussed above, functions relating to guided data exploration and more specifically relates to efficiently provide access to business intelligence by predicting possible next queries may include a cloud 1050 (see FIG. 10). It is to be understood that although this disclosure includes a detailed description of cloud computing as discussed hereinbelow, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 10, an illustrative cloud computing environment 1000 utilizing cloud computing is depicted. As shown, cloud computing environment 1000 includes cloud 1000 having one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms, and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
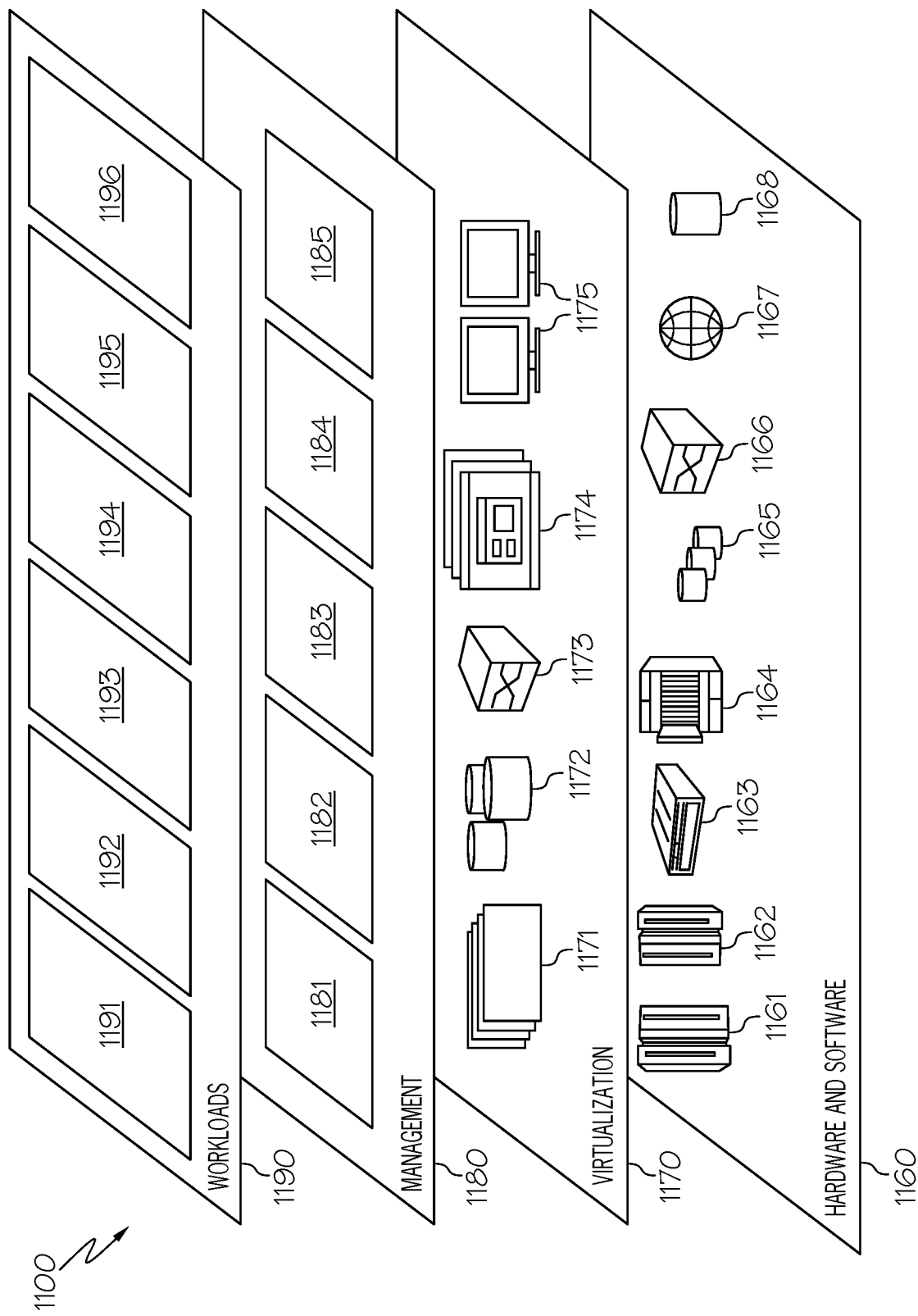
FIG. 11 depicts a set of functional abstraction layers provided by a cloud computing environment, according to one aspect of the present invention.

Referring now to FIG. 11, a set of functional abstraction layers 1100 provided by cloud computing environment 1000 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and a conversational space module 1196 to perform calculating a similarity between graph-structured objects, as discussed herein.

Non-Limiting Examples

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, although do not preclude the presence or addition of one or more other features, integers, steps, operations, elements, components, and/or groups thereof. The term "at least one of A and B" means A alone; B alone; or A and B.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand various embodiments of the present invention, with various modifications as are suited to the particular use contemplated.

What is claimed is:

1. A computer-implemented method of using a computing device to provide access to business intelligence data via a conversational interface, the method comprising:
   receiving, by a computing device, a plurality of prior user interactions based on corresponding pairs of user queries and computing device responses, with a conversational interface;
   receiving, by the computing device, a business intelligence (BI) ontology;
   receiving, by the computing device, access to a conversational space structure for the conversational interface;
   modeling, by the computing device, a state structure representation mechanism of the plurality of prior user interactions captured as a set of sessions, each including a sequence of states and a graph embedding learner using Graph Neural Networks to create a compact, low-dimensional representation for each state graph that utilizes embeddings generated by pre-trained language models on label names of individual measures and dimensions as input feature vectors;
   executing, by the computing device, a hybrid machine learning model based upon the plurality of prior user interactions, business intelligence ontology, and the conversational space structure to, in a first stage in a first time sequence, predict an intent of the user, and in a second stage in a second time sequence after the first time sequence, predict one or more possible next queries of the user; and
   sending to the user, by the computing device, the one or more possible next queries of the user that have been predicted in the second time sequence without a response to the one or more queries that have been predicted at the second time sequence, unless receiving an affirmative response from the user in a third time sequence after the second time sequence, in response to the one or more possible next queries sent to the user in the second time sequence.

2. The computer-implemented method of claim 1, further comprising:
   receiving, by the computing device, a user query, that is in addition to the plurality of prior user interactions with the conversational interface; and
   generating, by the computing device, a response to the user query;
   wherein prior to the sending to the user, by the computing device, the one or more possible next queries that has been predicted includes sending the response to the user query.

3. The computer-implemented method of claim 1, wherein the executing, by the computing device, the machine learning model to predict the one or more possible next queries includes the one or more possible next queries that are not included in the plurality of prior user interactions.

4. The computer-implemented method of claim 1, wherein the executing, by the computing device, the machine learning model to predict the one or more possible next queries includes using the compact, low-dimensional representation for each state graph.

5. The computer-implemented method of claim 1, wherein the machine learning model further includes a high-level action predictor for multi-class classification trained on embeddings of prior user sessions to predict a high-level action, comprising a pattern observed in business intelligence workloads and a session level task.

6. The computer-implemented method of claim 5, wherein the high-level action predictor includes one of a Random Forests, a Long Short-Term Memory (LTSM), a double Deep Q-Network (DQN), or a combination thereof as a multiclass classifier.

7. The computer-implemented method of claim 1, wherein the machine learning model further includes a business intelligence query predictor using collaborative filtering.

8. The computer-implemented method of claim 7, wherein the collaborative filtering includes one of index-based collaborative filtering, matrix factorization-based collaborative filtering or a combination thereof.

9. The computer-implemented method of claim 8, wherein prior to sending the one or more possible next queries that have been predicted, the possible next queries are further processed using one of data co-occurrence statistics, cardinality estimates and statistical distribution of the business intelligence data.

10. The computer-implemented method of claim 1, further comprising:
    representing queries of the business intelligence (BI) ontology as state graphs that capture a structural information within the queries; and
    wherein the one or more possible next queries that have been predicted are not based on the queries of prior user interactions.

11. A computer-implemented method of using a computing device to provide access to business intelligence data via a conversational interface, the method comprising:
    receiving, by a computing device, a plurality of prior user interactions based on corresponding pairs of user queries and computing device responses, with a conversational interface;
    receiving, by the computing device a business intelligence ontology;
    receiving, by the computing device, access to a conversational space structure for the conversational interface;
    modeling, by the computing device, a state structure representation mechanism of the plurality of prior user interactions captured as a set of sessions, each including a sequence of states and a graph embedding learner using Graph Neural Networks to create a compact, low-dimensional representation for each state graph that utilizes embeddings generated by pre-trained language models on label names of individual measures and dimensions as input feature vectors;
    executing, by the computing device, in a first stage in a first time sequence, a high-level action predictor for multi-class classification trained on embeddings of the prior user sessions to predict a high-level action, comprising patterns in the business intelligence data and a session level task to determine an intent of the user; and
    in a second stage in a second time sequence after the first time sequence, predicting one or more possible next queries of the user without providing a response to the one or more possible next queries predicted in the second time sequence, unless receiving an affirmative response from the user in a third time sequence after the second time sequence, in response to the one or more predicted possible next queries sent to the user in the second time sequence.

12. The computer-implemented method of claim 11, wherein the high-level action predictor includes at least one of a Random Forests, a Long Short-Term Memory (LTSM), a double Deep Q-Network (DQN), or a combination thereof.

13. A computer-implemented method of using a computing device to provide access to business intelligence data via a conversational interface, the method comprising:
receiving, by a computing device, a plurality of prior user interactions based on corresponding pairs of user queries and computing device responses, with a conversational interface;
receiving, by the computing device, a business intelligence ontology;
receiving, by the computing device, access to a conversational space structure for the conversational interface;
modeling, by the computing device, a state structure representation mechanism of the plurality of prior user interactions captured as a set of sessions, each including a sequence of states and a graph embedding learner using Graph Neural Networks to create a compact, low-dimensional representation for each state graph that utilizes embeddings generated by pre-trained language models on label names of individual measures and dimensions as input feature vectors;
executing, by the computing device, a hybrid machine learning model including a business intelligence query predictor of the user using collaborative filtering in a first time sequence; and
sending to the user, by the computing device, one or more predicted queries of the user in a second time sequence after the first time sequence, without a response to the one or more predicted queries, unless receiving an affirmative response from the user in a third time sequence after the second time sequence in response to the one or more possible next queries sent to the user in the second time sequence.

14. The computer-implemented method of claim 13, wherein the collaborative filtering includes one of index-based collaborative filtering, matrix factorization-based collaborative filtering or a combination thereof.

15. The computer-implemented method of claim 13, wherein prior to sending the one or more possible next queries that have been predicted, the one or more possible next queries are further processed using one of data co-occurrence statistics, cardinality estimates and statistical distribution of the business intelligence data.

16. A conversation device to provide access to business intelligence, comprising:
a processor device; and
a memory operably coupled to the processor device and storing computer-executable instructions causing:
receiving, by a computing device, a plurality of prior user interactions based on corresponding pairs of user queries and computing device responses, with a conversational interface;
receiving, by the computing device, a business intelligence ontology;
receiving, by the computing device, access to a conversational space structure for the conversational interface;
modeling, by the computing device, a state structure representation mechanism of the plurality of prior user interactions captured as a set of sessions, each including a sequence of states and a graph embedding learner using Graph Neural Networks to create a compact, low-dimensional representation for each state graph that utilizes embeddings generated by pre-trained language models on label names of individual measures and dimensions as input feature vectors;
executing, by the computing device, a hybrid machine learning model based upon the plurality of prior user interactions, business intelligence ontology, and the conversational space structure to, in a first stage in a first time sequence, predict an intent of the user, and in a second stage in a second time sequence after the first time sequence, predict one or more possible next queries of the user; and
sending to the user, by the computing device, the one or more possible next queries of the user that have been predicted in the second time sequence without a response to the one or more queries that have been predicted at the second time sequence, unless receiving an affirmative response from the user in a third time sequence after the second time sequence, in response to the one or more possible next queries sent to the user in the second time sequence.

17. The conversation device of claim 16, further comprising:
receiving, by the computing device, a user query, that is in addition to the plurality of prior user interactions with the conversational interface; and
generating, by the computing device, a response to the user query;
wherein prior to the sending, by the computing device, to the user the one or more possible next queries that has been predicted includes sending the response to the user query.

18. The conversation device of claim 16, wherein the executing, by the computing device, the machine learning model to predict the one or more possible next queries includes the one or more possible next queries that are not included in the plurality of prior user interactions.

19. The conversation device of claim 16, wherein the executing, by the computing device, the machine learning model to predict the one or more possible next queries includes using the compact, low-dimensional representation for each state graph.

20. A computer program product for using a computing device to provide access to business intelligence data via a conversational interface, the computer program product comprising:
a non-transitory computer readable storage medium readable by a processing device and storing program instructions for execution by the processing device, said program instructions comprising:
receiving, by a computing device, a plurality of prior user interactions based on corresponding pairs of user queries and computing device responses, with a conversational interface;
receiving, by the computing device, a business intelligence ontology;
receiving, by the computing device, access to a conversational space structure for the conversational interface;
modeling, by the computing device, a state structure representation mechanism of the plurality of prior user interactions captured as a set of sessions, each including a sequence of states and a graph embedding learner using Graph Neural Networks to create a compact, low-dimensional representation for each state graph that utilizes embeddings generated by pre-trained language models on label names of individual measures and dimensions as input feature vectors;

executing, by the computing device, a hybrid machine learning model based upon the plurality of prior user interactions, business intelligence ontology, and the conversational space structure to, in a first stage in a first time sequence, predict an intent of the user, and in a second stage in a second time sequence after the first time sequence, predict one or more possible next queries of the user; and sending to the user, by the computing device, the one or more possible next queries of the user that have been predicted in the second time sequence without a response to the one or more queries that have been predicted at the second time sequence, unless receiving an affirmative response from the user in a third time sequence after the second time sequence, in response to the one or more possible next queries sent to the user in the second time sequence.

21. The computer program product of claim 20, further comprising:

receiving, by the computing device, a user query, that is in addition to the plurality of prior user interactions with the conversational interface; and generating, by the computing device, a response to the user query;

wherein prior to the sending, by the computing device, to the user the one or more possible next queries that has been predicted includes sending the response to the user query.

22. The computer program product of claim 20, wherein the executing, by the computing device, the machine learning model to predict the one or more possible next queries includes the one or more possible next queries that are not included in the plurality of prior user interactions.

* * * * *